May 28, 1940.  H. F. MAY ET AL  2,202,392
QUOTATION SYSTEM
Original Filed Jan. 26, 1932   16 Sheets-Sheet 5

INVENTORS
Harold F. May
Frazier O. Stratton
Ward, Crosby & Neal
ATTORNEYS

May 28, 1940.　　　H. F. MAY ET AL　　　2,202,392
QUOTATION SYSTEM
Original Filed Jan. 26, 1932　　16 Sheets-Sheet 6
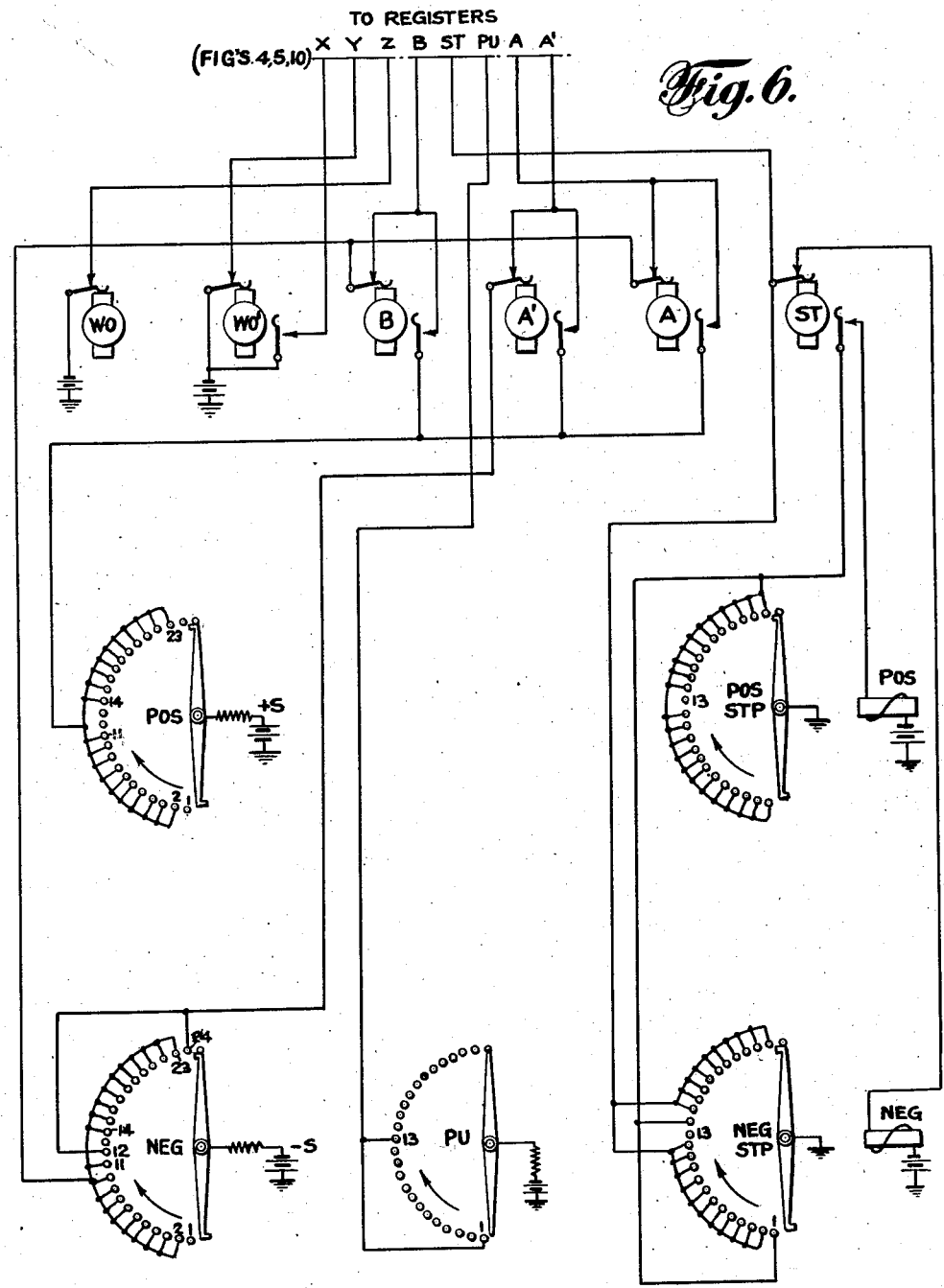

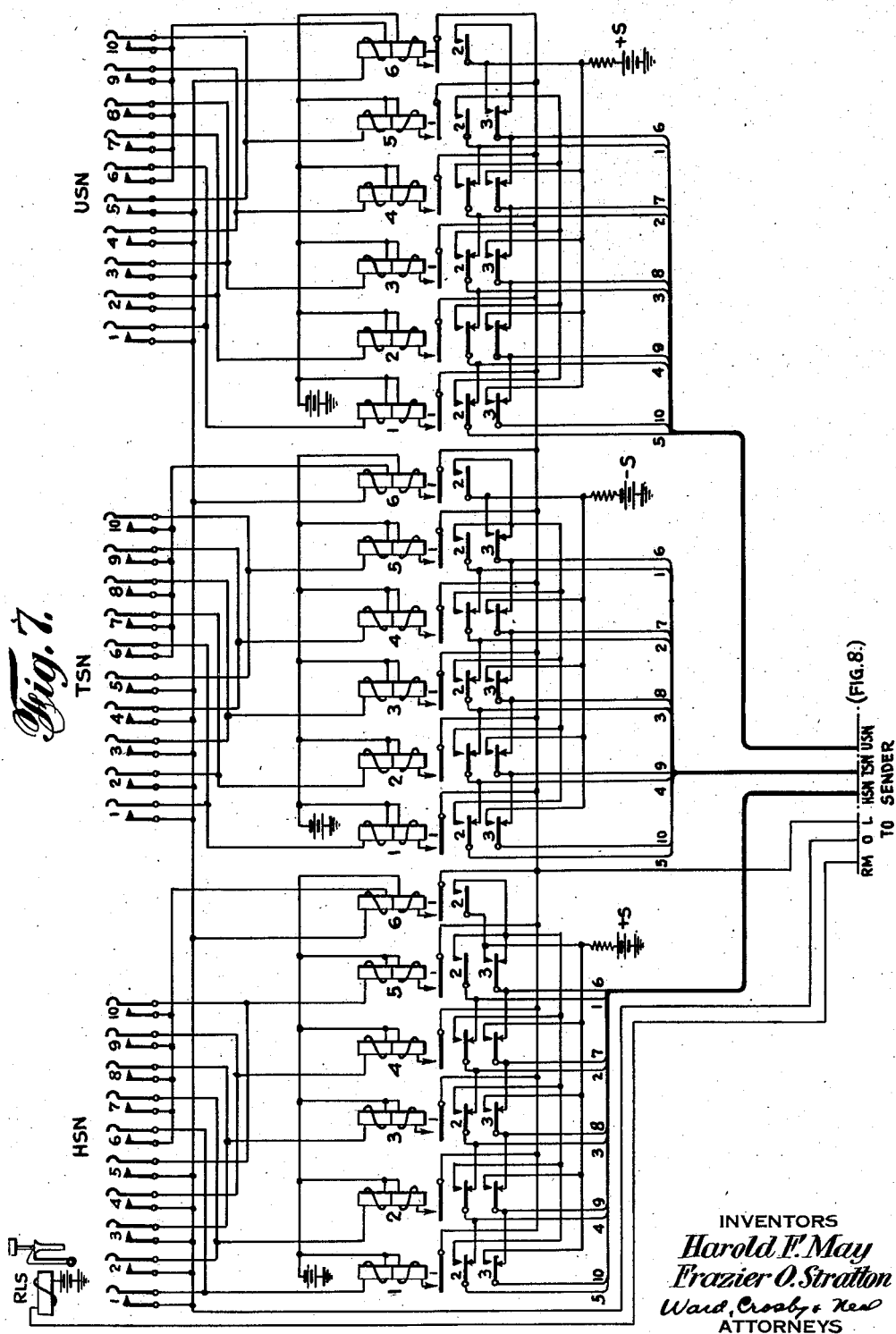

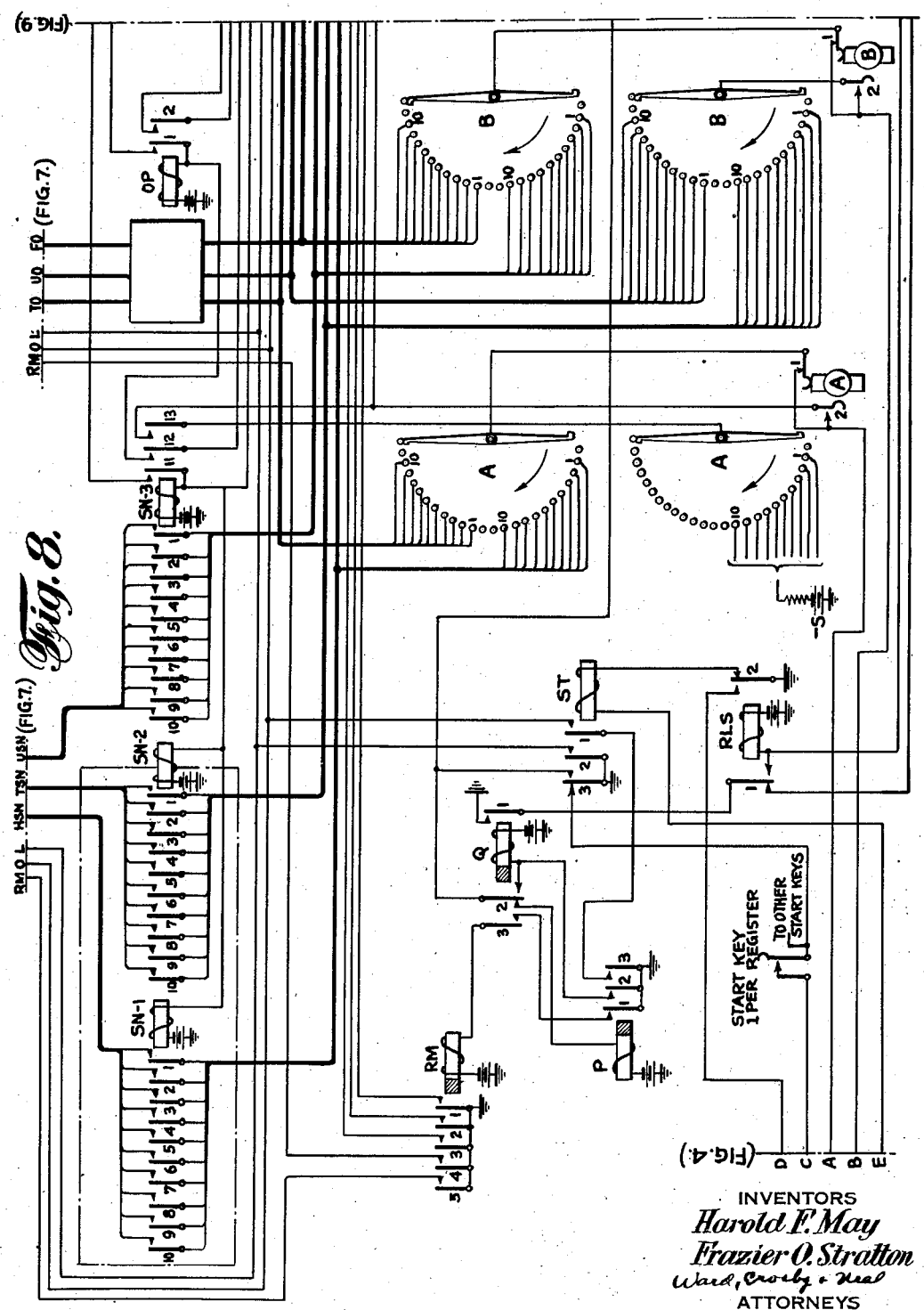

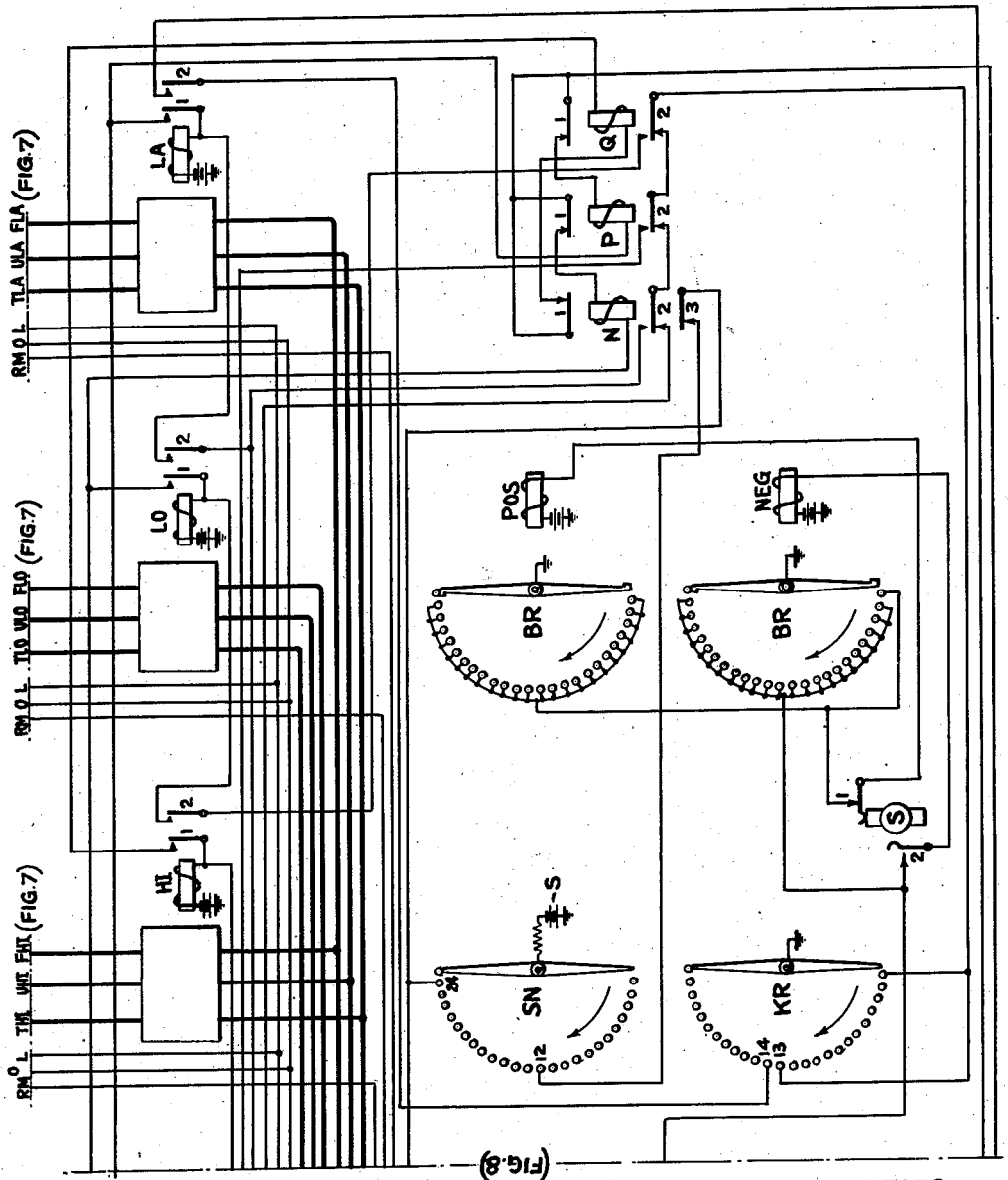

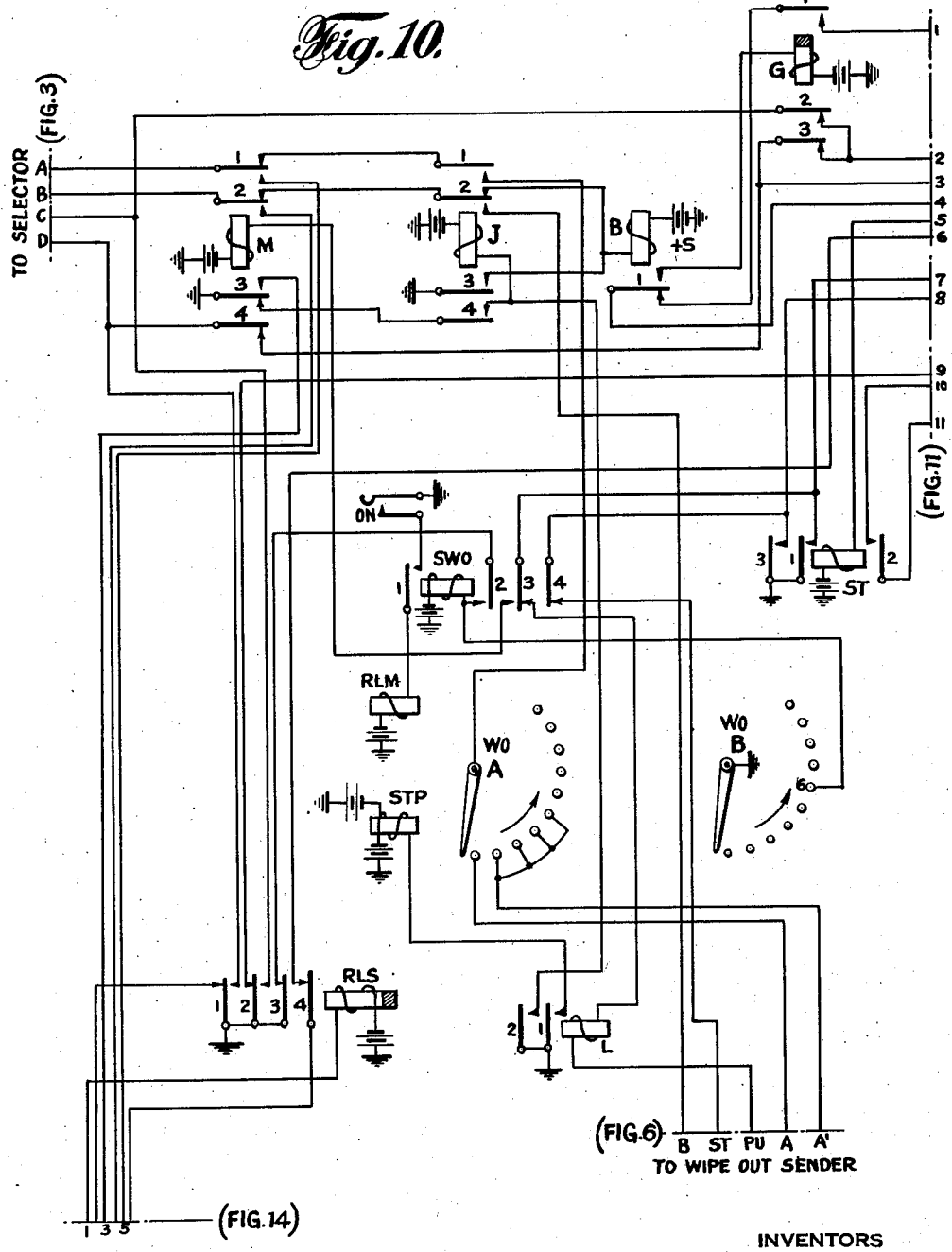

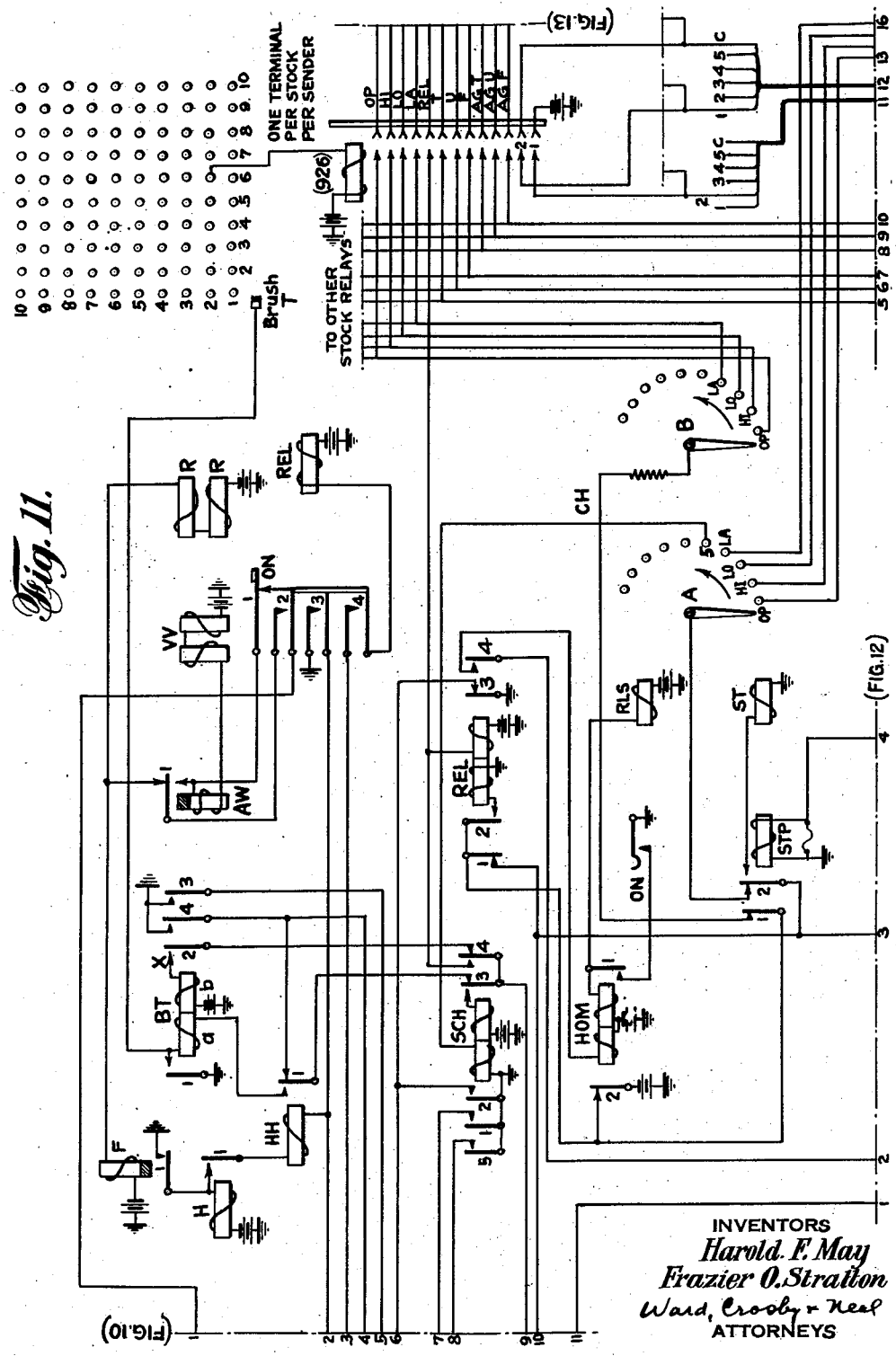

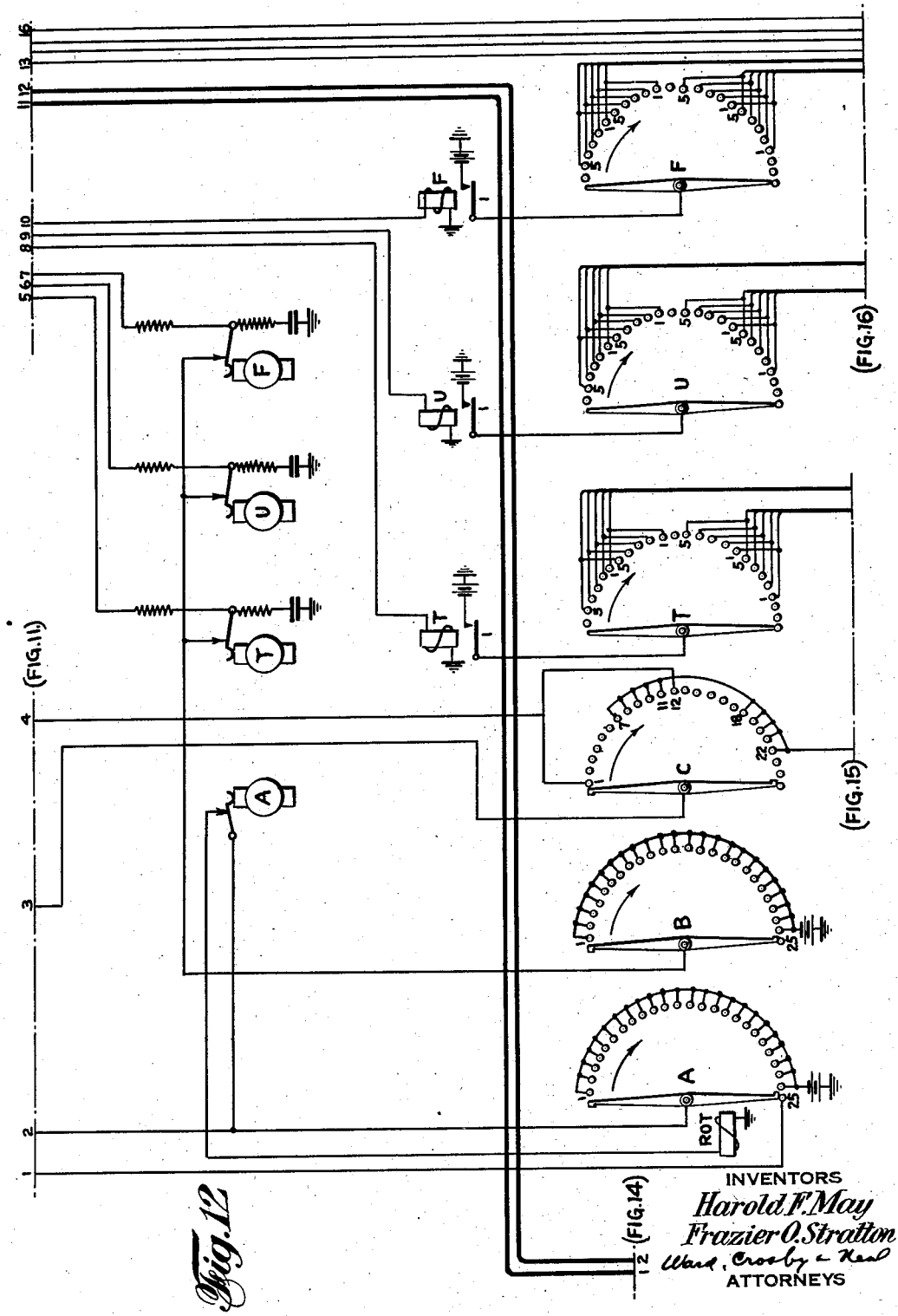

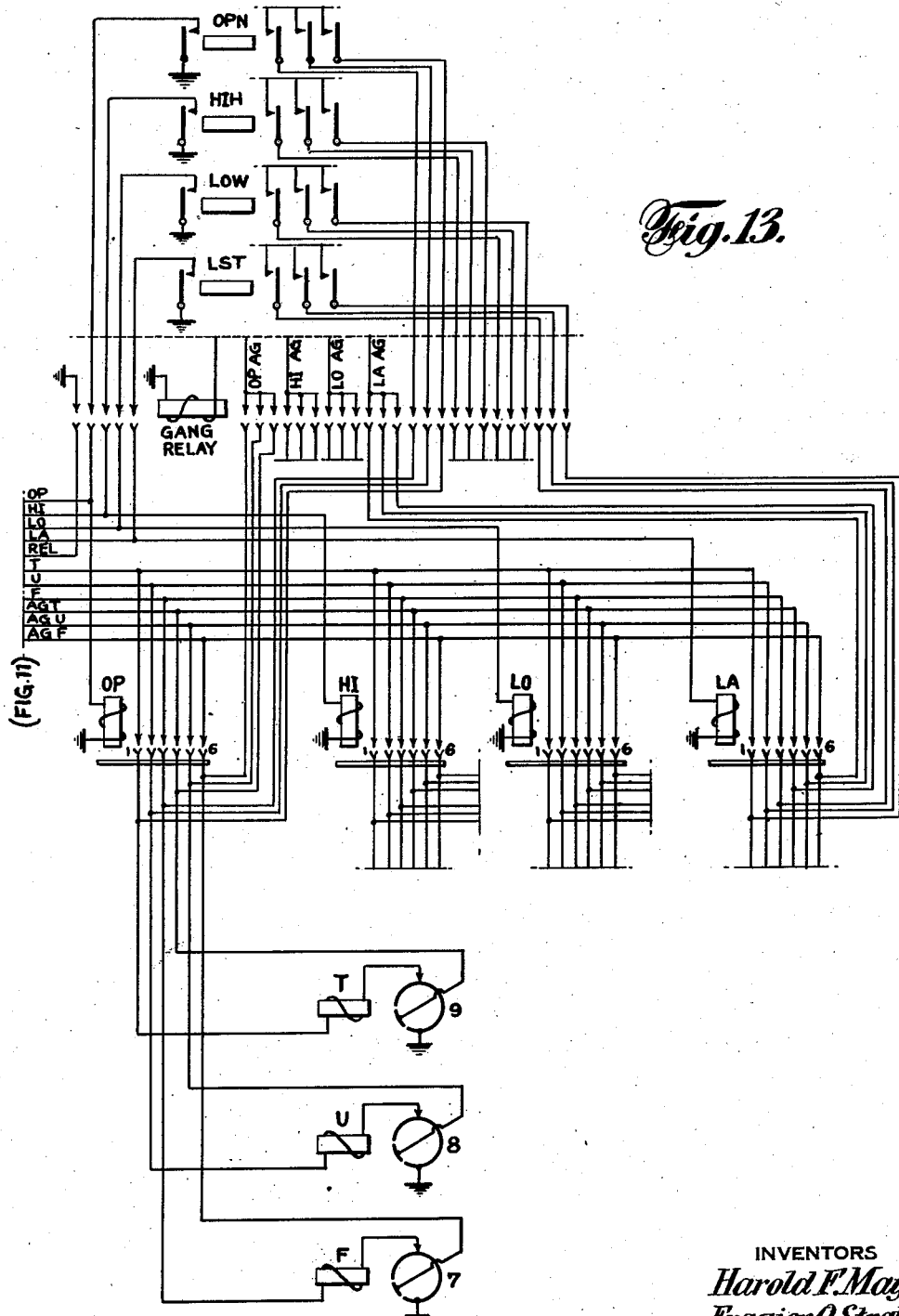

May 28, 1940.　　　　H. F. MAY ET AL　　　　2,202,392
QUOTATION SYSTEM
Original Filed Jan. 26, 1932　　16 Sheets-Sheet 14
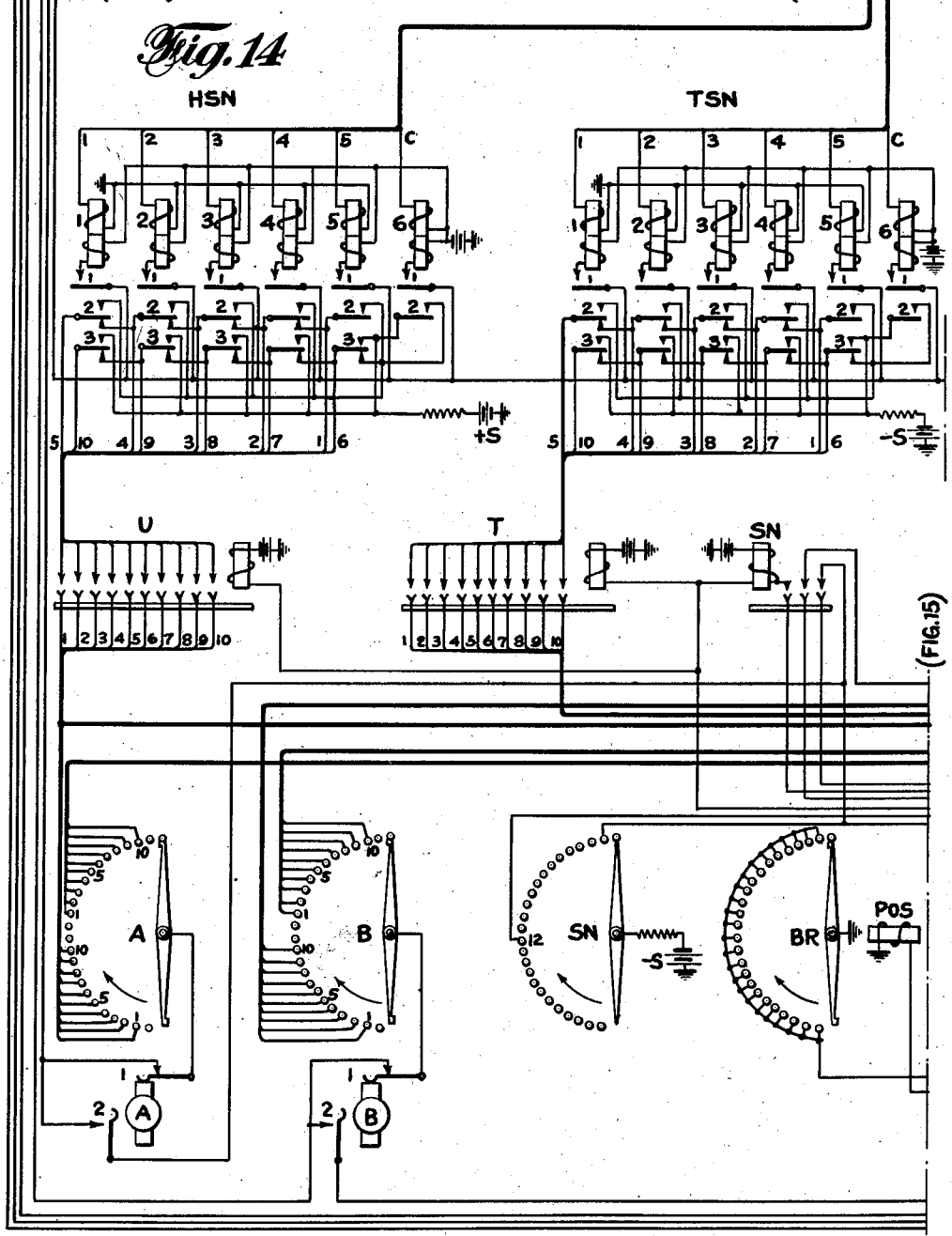
INVENTORS
*Harold F. May*
*Frazier O. Stratton*
ATTORNEYS

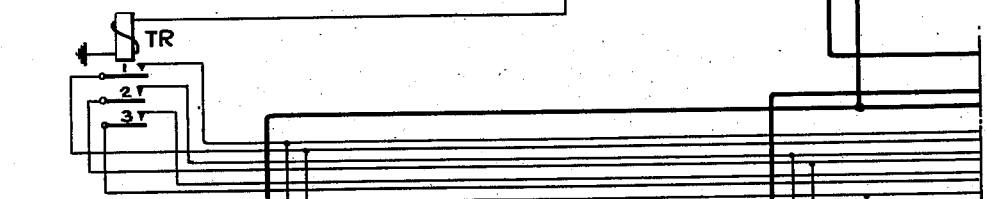
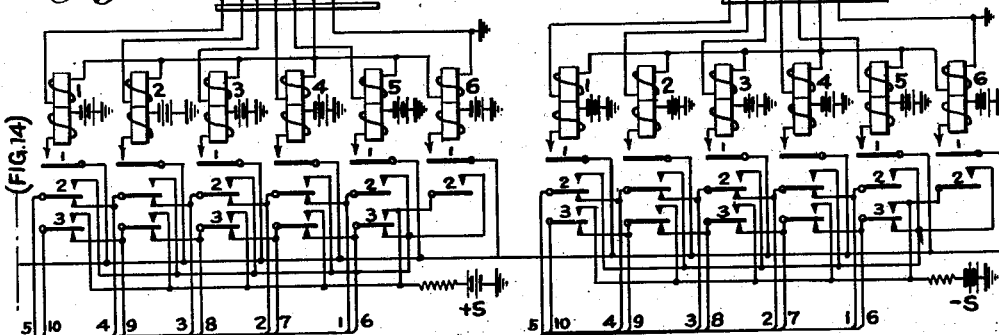
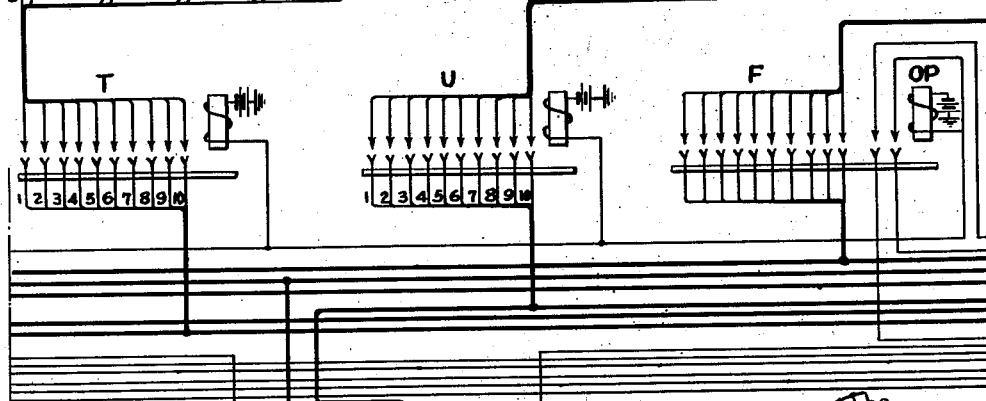

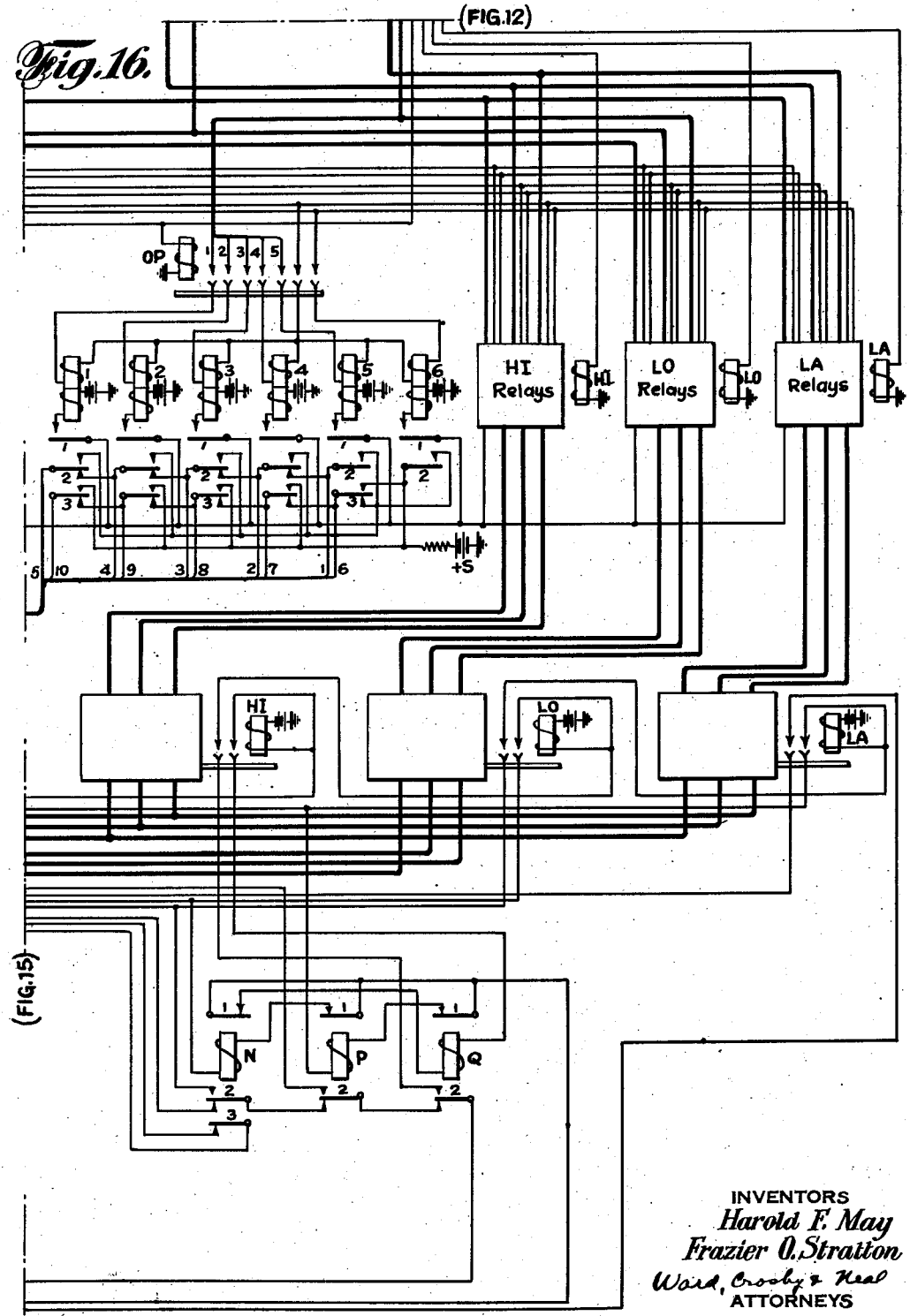

Patented May 28, 1940

2,202,392

UNITED STATES PATENT OFFICE 2,202,392

QUOTATION SYSTEM

Harold F. May, Valley Stream, and Frazier O. Stratton, New York, N. Y., assignors to The Teleregister Corporation, New York, N. Y., a corporation of Delaware Application January 26, 1932, Serial No. 588,914
Renewed September 23, 1938

15 Claims. (Cl. 177—353)

This invention relates to a system for supplying quotations to various subscribers.

Among the objects of this invention is the provision of mechanism by means of which any one of a large number of subscribers may electrically transmit his request for the price quotations on any desired item to the one of a plurality of central transmitting operators who is assigned to transmit information in reference to the item requested, and the provision of mechanism whereby such operator may transmit electrically to indicating means located in the subscriber's office the designation of the item and the price quotations relating to such item.

Another object of this invention is the provision of mechanism in a system of this character for automatically transmitting back to the subscriber the designation of the item in reference to which information has been requested and also the information requested.

Another object of this invention is the provision of mechanism at a central information bureau by means of which information requested may be transmitted to the calling subscriber under the control of a manually controlled set-up device, or automatically under the control of an available record of the information desired.

Other objects of the invention include the provision of mechanism whereby any one of the plurality of subscribers on the same line will receive a signal when the line is used by other subscribers; the provision of means whereby any subscriber of a group of subscribers on the same line is prevented from using his equipment while another subscriber is using his equipment; the provision of means for indicating to the calling subscriber that the mechanism is in condition for receiving his request; the provision of a wire center for connecting the calling subscriber's lines through to the central information bureau; mechanism in the central information bureau for displaying on indicators the designation of the item in reference to which information is requested; mechanism for setting up such indication in the operator's position who is assigned to transmit information in reference to such item requested; mechanism for automatically connecting the subscriber's item designation indicators to the subscriber's lines and for transmitting pulses to restore the item designation indicators to normal; mechanism for connecting the subscriber's lines to his group of price indicators successively and for transmitting pulses to restore said price indicators to normal; mechanism for signalling to the operator assigned to transmit information as to the item requested, to indicate that the subscriber's indicators have been restored to normal; a key set equipment upon which information as to the item designation and the prices may be set up; a transmitting mechanism for transmitting impulses over the subscriber's lines to the various indicators successively group by group under control of the key set-up; mechanism for automatically controlling the transmission of impulses to one of the stock number indicators; mechanism for automatically restoring the operator's indicators to normal; mechanism for selecting a group of indicators on a central checkboard and for controlling the automatic transmission back to the subscriber's indicators of the item designation under control of said selecting means; means under the control of the selected indicators on the central checkboard for controlling the setting-up operation of the indicators in the calling subscriber's equipment; means in the central information bureau for rotating the selected indicators through a complete rotation thereby operating storage relays, which in turn control the setting-up operation of the indicators in the subscriber's equipment, as the selected indicators in the central information bureau are moved from their normal position to their previous set-up position; means in the central information bureau for interrupting the operation of the storage relays and restoring them to normal when such indicators are selected to receive a new set-up; and improved means for controlling the proper cooperation of various mechanisms which this system comprises.

Other objects of the invention will appear from the following description taken in connection with the drawings, in which Fig. 1 shows a subscriber's equipment;

Fig. 6 shows the wipe-out sender;

Figs. 7, 8 and 9 show a keyboard, storage relays controlled thereby and a transmission mechanism operable under control of the keyboard;

Figs. 10, 11, 12, 13, 14, 15 and 16 show the automatic sender which includes mechanism for selecting any desired stock and for automatically transmitting impulses to operate the calling subscriber's indicators.

Fig. 10 shows a register equipment controlling the automatic wiping-out of the subscriber's indicators and means for connecting the subscriber's lines responsively to the selector equipment in Fig. 11, and the transmitting mechanism in Fig. 14;

Fig. 11 shows the stock selector mechanism and a stock selection gang relay;

Fig. 12 shows the checkboard indicator pulsing mechanism and means for controlling the operation of the storage relays in Figs. 14, 15 and 16;

Fig. 13 shows a group of indicators and operating circuits together with selecting and releasing devices;

Fig. 14 shows the hundreds and tens stock number storage relays and a part of the automatic transmission mechanism; and Figs. 15 and 16 show the "open," "high," "low" and "last" storage relays and a part of the automatic transmission mechanism.

Figure 1:
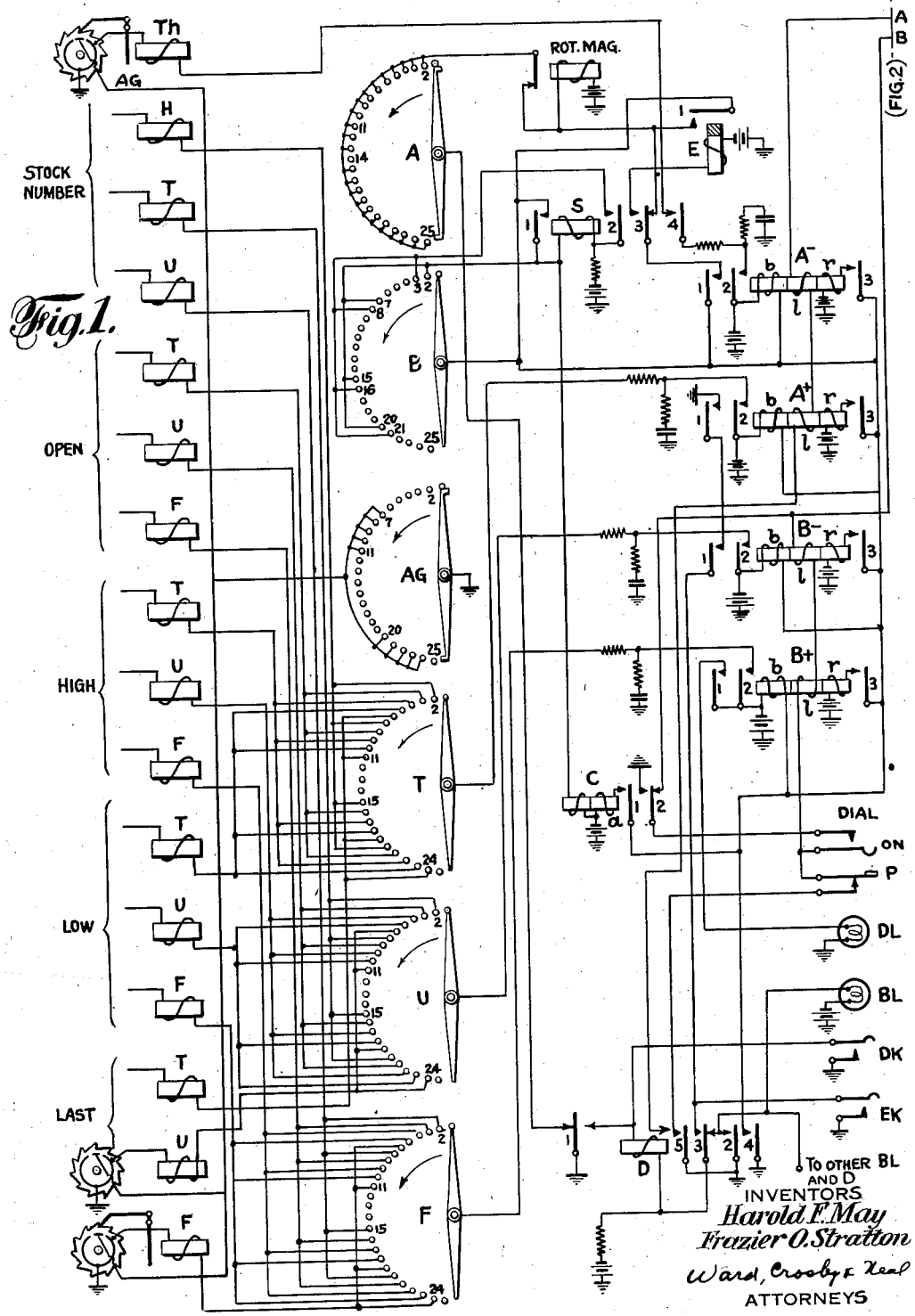

The drawings disclose a preferred embodiment of the invention for purposes of illustration only, as it is obvious that various changes could be made and that different elements, or groups of elements, of the combination could be changed or could be replaced by equivalent mechanisms, and that the system could be used for transmitting information of any desired character. For the purpose of disclosure, however, the system will be referred to as a system for transmitting to any calling subscriber the designation of the stock with reference to which a call was made and the various prices of the stock such as the "open," "high," "low" and "last" prices. A key controlled transmitting mechanism has been shown in the central information bureau, as well as an automatic transmission mechanism which is under the control of indicators of a checkboard, or the like. Either one of these mechanisms may be used alone, or the two may be used in combination as found desirable. Various other features especially applicable to transmission of stock quotations in the general system disclosed have been shown as preferred forms and mechanisms for performing their functions. For the purpose of disclosure of the invention the quotation system comprising the mechanisms shown in the drawings will be described specifically, and after understanding the single embodiment disclosed the invention in its broader aspects will also be understood and other uses to which this system and various features thereof are applicable will become apparent to those skilled in the arts to which such systems and features are applicable.

The following is a description of a preferred system and combination of mechanisms for securing stock prices from a central information bureau through the medium of indicator units which respond to electrical impulses sent out from this bureau. Stock prices are requested by dialing a code number upon a telephone type dial associated with groups of indicators in the subscriber's equipment. Two wires connect the indicators and auxiliary equipment, shown in Fig. 1, to a wire center, Fig. 2, including line finder equipment. By the use of the line finder equipment economy in the number of wires connecting the central information bureau to the various subscribers, is secured.

Upon the origination of a call by a subscriber, the line finder equipment functions to connect the calling subscriber to a trunk circuit extending to the central information bureau. The other end of this trunk circuit terminates on selector equipment shown in Fig. 3, which receives the first digit dialed by the subscriber. The selector consists of a two motion switch which after rising to a level corresponding to the first digit dialed, automatically rotates until it is connected to an idle register, Figs. 4 or 5, or to an automatic transmitter, Figs. 10 to 16. Depending upon the first digit dialed, the idle register awaits further dialing or immediately proceeds to blank out the subscriber's equipment. The later occurs when zero is dialed.

Figure 4:
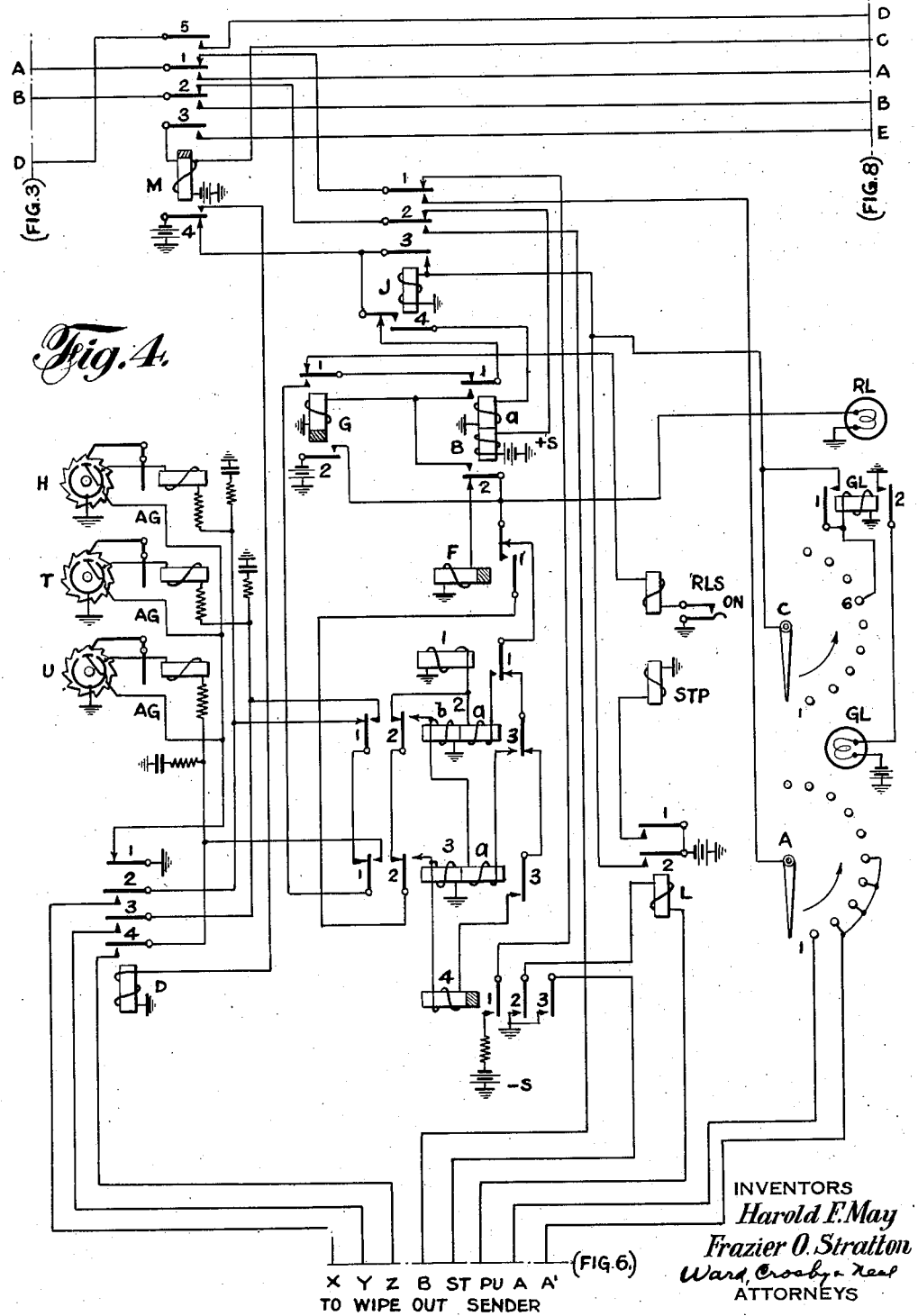
Fig. 4 shows a register including a set of item designation indicators.
Figure 5:
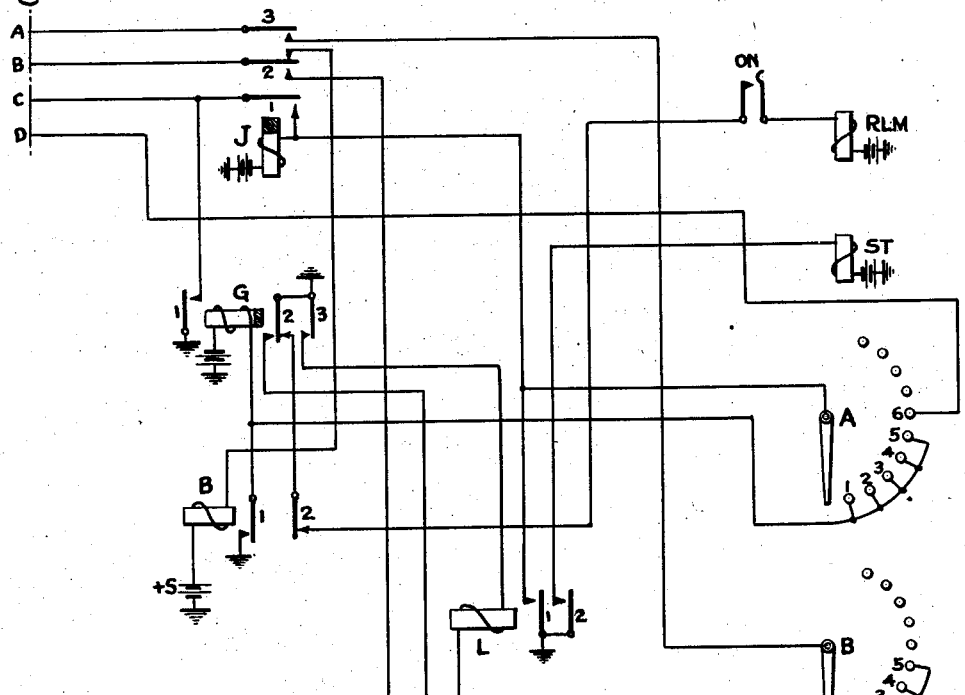
Fig. 5 shows a wipe-out register which is chosen when the subscriber desires to delete a previous display.

The register equipment shown in Fig. 4, or the automatic transmitter equipment, Figs. 10 to 16, receives the next digits dialed by the subscriber. The indicator units shown in Fig. 4 are located in front of an operator. The operator has access to the keyboard of a transmitter shown in Figs. 7 to 9. The next three digits dialed by the subscriber actuate the indicator units, thereby displaying before the operator the code number of the stock upon which a price is desired. The operator may now set up the code number and prices of the stock on the keyboard. Following the completion of dialing, the subscriber's equipment is connected to a wipe-out sender, Fig. 5, which blanks out any previous display on the subscriber's indicators. Upon completion of the wiping-out process the operator receives a signal notifying her that the subscriber's equipment is ready to receive the code number and prices of the stock which have been set up on the keyboard associated with her transmitter.

Upon depression of the start key shown on Fig. 8, the transmitter functions to send out trains of impulses representing the code number of the stock on which information has been requested, and the "open," "high," "low" and "last" prices of that stock. When the transmission is completed the subscriber's equipment is automatically disconnected and the intermediate equipment restores to normal. If the subscriber has dialed zero, the equipment is connected to a register shown in Fig. 5 instead of that shown in Fig. 4. This register begins wiping out the previous display on the subscriber's equipment immediately following the dialing of the first digit, which is zero in this case. After completing the wiping-out process the subscriber's equipment is disconnected and the intermediate equipment released.

Figure 3:
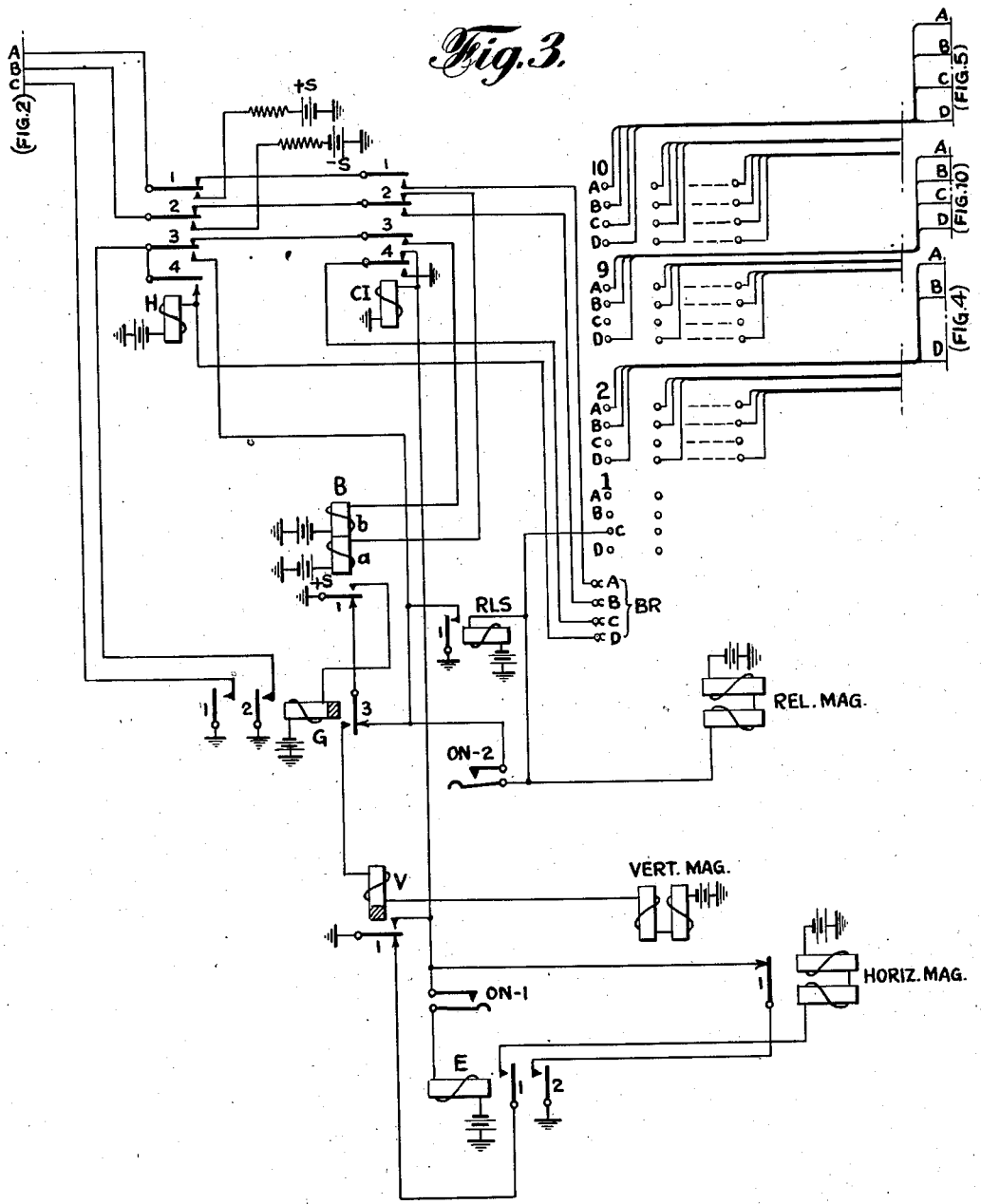
Fig. 3 shows the selector equipment at the central information bureau.

Certain of the levels on the bank of the selector switch, Fig. 3, may be assigned to automatic transmitters which function to send back the price requested without the intervention of an operator. The prices to be transmitted are displayed in this system on a Teleregister board similar to that supplied to regular brokerage offices. The automatic transmitter, Figs. 10 to 16, receives the last two digits of the stock number dialed by the subscriber, and selects the stock on the checkboard corresponding to the code number dialed by the subscriber. The automatic transmitter, through a process described later, takes the prices from the indicators and performs an operation equivalent to depressing the keys on a regular transmitter. When the complete prices have been taken from the indicators the automatic transmitter sends out trains of impulses which cause the subscriber's equipment to display the stock number, and the "open," "high," "low" and "last" prices of that stock. Following the transmission, the subscriber's equipment is disconnected and all intermediate equipment restored to normal.

The following describes in detail the progress of a normal call requesting a stock price from an operator:

The subscriber originates the call by operation of the key DK, Fig. 1, which operates the relay D over the following path: ground through contact of key DK, through the winding of relay D, through resistance, to battery. Relay D locks up to ground on its own contact 1. The operation of relay D lights the busy lamp BL over the following path: ground through contact 2 of relay D, through the lamp BL, to battery. It also connects ground to the normal contacts 3 of all other D relays in subscribers' sets connected to the same subscriber's line and lights the busy lamps in these sets. This ground serves to hold the other D relays short-circuited so that no other subscriber can interfere with the call in progress. The operation of relay D also energizes the biasing windings b of the relays A—, A+, B— and B+, over its contact 4. The operation of relay D also prepares a path over its contact 3 for short-circuiting relay D, should the subscriber desire to abandon the call before completion. The relay D may be short-circuited and released by pressing the key EK which forms a path for ground through the contact of the EK key, through contact 3 of relay D, to the battery side of the winding of relay D. This diverts the current normally going through the coil of relay D causing the relay to release.

The operation of relay D also connects ground through the line windings 1 of relays A—, A+, B— and B+ to their respective lines A and B. The circuit of line A is through the 1 windings of relays A— and A+, through contact 5 of relay D, to ground. The circuit of line B is through the 1 windings of relays B— and B+, through the P contact of the dial, through contact 5 of relay D, to ground. The connecting of ground through the line relays B— and B+ to line B sets into operation the line finder shown on Fig. 2. Each subscriber's equipment is associated with an L and CO relay at the wire center, Fig. 2. The connection of ground to lead B through the back contacts 2 of the CO relay operates the associated L relay.

Figure 2:
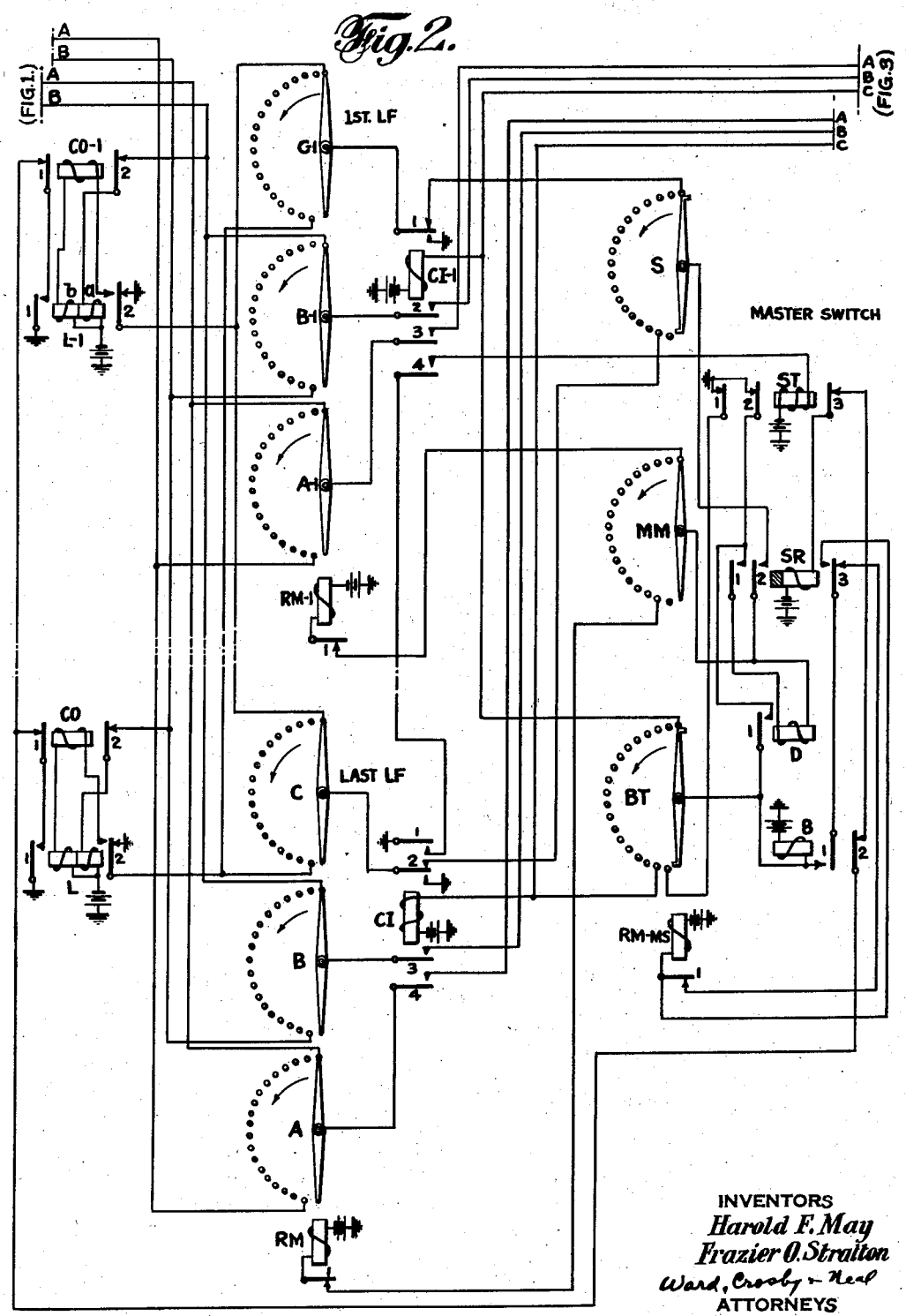
Fig. 2 shows line relay and line finder equipment at the wire center.

In following this call, let us assume that the subscriber's line is associated with relays CO—1 and L—1, Fig. 2. The path for operating relay L—1 is battery through winding a, through the normal contact 2 of relay CO—1, over line B to ground at the subscriber's premises. The operation of relay L—1 connects ground through contact 1 of L—1, through normal contact 1 of CO—1, through normal contact 2 of relay B, through normal contact 3 of relay ST, to the winding of relay SR, thereby operating it. The operation of relay L—1 has also removed ground from the associated contact on bank C of every line finder. The various line finder switches are resting upon the contact last used by that switch, that is, the line finder switches have no normal position.

The operation of relay SR connects bank wiper MM through contact 2 of relay SR to bank wiper S. The bank wipers just mentioned are resting on terminals connected to the first idle line finder, and as each line finder functions the wipers step to the next idle finder in the position shown in Fig. 2. The first line finder rotary magnet RM—1 is connected through a self interrupting contact 1 through bank MM, through contact 2 of relay SR, through bank contact S, through normal contact 1 of relay CI—1, to the wiper of bank C—1. All the terminals of bank C—1, with the exception of those terminals associated with subscriber's originating calls at that instant, are grounded over contact 2 of the L relays. The ground thus supplied to the rotary magnet of the first line finder switch causes it to buzz around until its wiper encounters a non-grounded terminal. In this position wipers A and B, which are on the same shaft as wiper C, are connected to lines A and B of the calling subscriber. In Fig. 2 no buzzing would be necessary as the first line finder is shown in the proper position for picking up the line associated with relay L—1.

The operation of relay SR, previously mentioned, also connected ground through normal contact 2 of relay ST, through contact 1 of relay SR, to the winding of relay D. However, the ground from the terminals on bank C—1 which is connected through contact 2 of relay SR to the other side of relay D has kept relay D short-circuited. When wiper C—1 encounters a non-grounded terminal, relay D operates; the path is from battery through the winding of the rotary magnet RM—1 of the first line finder switch, over contact 1 of the rotary magnet RM—1, through bank MM, through the winding of relay D, through contact 1 of relay SR, to ground on the normal contact 2 of relay ST. The operation of relay D closes a circuit from ground on the normal contact 2 of relay ST, through contact 1 of relay D, to the winding of relay B, operating relay B. Relay B extends this ground through its contact 1, through contact 3 of relay SR, to the winding of the rotary magnet RM—MS. This operates the rotary magnet RM—MS. However, the operation of relay B removed the ground through normal contact 2 of relay B, through normal contact 3 of relay ST, from the winding of the SR relay. The SR relay releases, and in releasing de-energizes the rotary magnet RM—MS causing the switch to step to the next line finder terminal.

If it so happens that the next terminal on bank BT of the switch is connected to a line finder which is still busy, a ground coming back from the selector over lead C is connected through the wiper BT, through contact 1 of relay B, through the normal contact 3 of relay SR, through the self-interrupting contact 1 of the rotary magnet RM—MS, to the winding of the rotary magnet. This causes the rotary magnet RM—MS to buzz the switch around until an idle line finder is found. However, before the rotary switch steps to the next idle line finder the ground from normal contact 2 of relay ST, through contact 1 of relay D, through bank BT, operates relay CI—1. The operation of relay CI—1 connects lines A and B through the wipers A and B, through contacts 3 and 2 of relay CI—1, to lines A and B from the wire center to the central information bureau.

The operation of relay CI—1 also connects ground through contact 1 of relay CI—1 to the terminal on bank C—1 upon which the first line finder is resting. This is to insure that other line finders will not stop on this terminal. The release of relay SR releases relay D and relay B releases when the next idle line finder has been found. The operation of relay CI—1, in connecting ground to bank C—1, furnishes a locking path for relay L—1 and relay CO—1 in series, the path being through contact 2 of relay L—1, through the winding of relay CO—1, and through winding b of relay L—1.

The operation of relay CO—1 removes the starting ground previously furnished through contact 1 of relay L—1. The operation of relay CI—1, also closes a portion of a series circuit through contact 4 so that when all line finders are busy ground will be connected through contact 1 of relay CI of the last line finder, through contacts 4 on all other CI relays, to operate relay ST. The operation of relay ST prevents the master switch for hunting continually since the operation of relay ST removes ground from the last contact of bank BT, causing the relay B to release and open the operating circuit for the rotary magnet RM—MS. As soon as one of the line finders becomes idle relay ST releases and the master switch will hunt for the idle line finder.

Throughout the duration of the call the following relays remain operated in the line finder— relays L—1, CO—1 and CI—1 in the first line finder. The operation of the line finder has extended the subscriber's line to the selector shown on Fig. 3. The ground from the subscriber's equipment over lead B now operates relay B in the selector, the path being through the normal contact 2 of relay H, through normal contact 2 of relay CI—1, through the winding $a$ of relay B, to battery. The positive signal battery flowing through relay B operates the B+ relay in the subscriber's equipment, Fig. 1, which connects battery through contact 1, to the lamp DL. The lighting of lamp DL is an indication to the subscriber that the equipment is ready to receive his dialing.

Referring to Fig. 3, the operation of relay B has operated relay G through contact 1 of relay B. The operation of relay G has connected ground through contact 1 of relay G, to lead C, which holds relay CI—1, operated in the first line finder, Fig. 2. The subscriber now dials, and it should be noted that during the operation of dialing the ON contact on the dial short-circuits the relays B— and B+ so that the path for dialing is ground through contact 5 of relay D, through the P contact of the dial, through the ON contact of the dial, through normal contact 2 of relay C, over line B and the line finder equipment, Fig. 2, to the selector equipment, Fig. 3. The operation of the dial interrupts this ground circuit causing relay B in the selector, Fig. 3, to release a number of times corresponding to the digit dialed. Each time that relay B releases a path is completed for the operation of the vertical magnet Vert. Mag. in the selector. The path is through normal contact 1 of relay B, through contact 3 of relay G which does not release because of its slow releasing characteristic, through the winding of the V relay, over the winding of the vertical magnet, to battery and ground.

The vertical magnet causes the brushes A, B, C and D (BR) to rise one level for each impulse received. As the pulses energize the vertical magnet, relay V, which is also slow releasing, operates and holds up throughout the dialing of the first digit. As soon as the brushes take their first vertical step and the contacts designated ON—1 and ON—2 close, ground through contact 1 of relay V operates relay E which locks up through the normal contact 1 of the horizontal magnet, through contact 2 of relay E, to ground. When the pulses cease relay V releases closing a path for ground through the normal contact 1 of relay V, through contact 1 of relay E, over the winding of the horizontal magnet Horiz. Mag., to battery and ground. This energizes the horizontal magnet causing the brushes to step to the first group of terminals in the level chosen. The operation of the horizontal magnet also releases relay E which in turn deenergizes the horizontal magnet.

If, however, the first group of terminals is busy, terminal C in this group will be grounded. This ground will be fed back through normal contact 4 of relay CI, through ON—1 contact, to reoperate relay E. Reoperating relay E causes the horizontal magnet to be reenergized so that the wipers step to the next group of terminals. It should be noted that relay E will not operate in series with relay CI. During this hunting operation direct ground on bank terminal C has kept relay CI short-circuited, but upon completion of the hunting, relay CI operates in series with relay E, the path being battery through the winding of relay E, through ON—1 contact, through the winding of relay CI, to ground. The operation of relay CI connects ground through its contact 4, through brush C, to the terminal C, upon which the brushes are resting.

As these terminals are multipled to similar switches in other selectors, this insures that no other selector will stop on the same group of terminals. Provision is made in this circuit for automatically releasing the selector, should the subscriber dial a one for the first digit. This is accomplished by connecting terminal C in the first level to the RLS relay so that when relay CI operates ground will be connected through brush C, through terminal C, to operate the release relay. The release relay locks up through ON—2 contacts and holds ground on the winding of the release magnet Rel. Mag. until ON—2 opens indicating that the switch has restored to normal. The subscriber may dial one for the digit repeatedly without affecting the equipment in any way, but upon dialing any other digit the equipment will function in the manner described above.

Upon operating the relay CI ground is connected from contact 2 of relay G, through normal contact 3 of relay H, through contact 3 of relay CI, to hold relay B operated over winding $b$. The following relays remain operated throughout the duration of the call: relays B, G and CI. The operation of relay CI extends leads A and B from the subscriber's equipment to a register, Fig. 4. The ground on lead B operates relay B in the register over a path from the subscriber's premises through the line finder and selector equipment, through normal contact 2 of relay M in the register, through normal contact 2 of relay J, through the winding of relay B, to positive battery.

The operation of relay B operates relay G from battery through normal contact 4 of relay M, through the normal contact 4 of relay J, through contact 1 of relay B, to the winding of relay G. The operation of relay G in closing its contact 2, lights lamp RL indicating to the operator that a call is in progress. The subscriber now dials the remaining three digits of a stock number causing the B relay to release a number of times corresponding to the digits dialed. Each time the B relay releases relay F is energized and remains operated throughout each series of pulses. The operating circuit for relay F is from battery, over contact 2 of relay G, back contact 2 of relay B, and the winding of relay F, to ground. The operation of relay F operates relay 1 from battery, through contact 2 of relay G, through contact 1 of relay F, through normal contact 2 of relay 3 through normal contact 2 of relay 2, to the winding of relay 1. Each time relay B releases battery is connected through normal contact 4 of relay M, through normal contact 4 of relay J, through normal contact 1 of relay B, through contact 1 of relay G, through normal contact 1 of relay 3, through normal contact 1 of relay 2, to the operating magnet of the hundreds indicator H which records the second digit dialed.

At the end of the second digit dialed relay F releases removing the operating path from relay 1 but furnishing a locking path for relays 1 and 2 in series, the path being through contact 2 of relay G, through normal contact 1 of relay F, through contact 1 of relay 1, through winding $a$ of relay 2, through the winding of relay 1 to ground. The operation of relay 2 transfers the path of the pulses generated by relay B from the hundreds indicator H to the tens indicator T.

The third digit dialed by the subscriber actuates the tens indicator T in a manner similar to that described for the hundreds indicator H. The F relay remains operated throughout the train of pulses, holding relay 2 operated over a path from contact 2 of relay G, through contact 1 of relay F, through normal contact 2 of relay 3, through contact 2 of relay 2, over the winding $b$ of relay 2, to ground. The operation of relay F also releases relay 1, and at the end of the third train of pulses relay F releases opening the operating path of relay 2 but completing a locking path for relays 2 and 3 in series, in path being from battery through contact 2 of relay G, normal contact 1 of relay F, normal contact 1 of relay 1, contact 3 of relay 2, winding $a$ of relay 3, and winding $b$ of relay 2 to ground. The operation of relay 3 transfers the path of the pulses generated by relay B to the units indicator U which displays the fourth digit dialed by the subscriber.

After the fourth digit has been set up on indicator U, relay 4 operates in series with relay 3 in a manner similar to that described for relay 3. The operation of relay 4 connects ground through its contact 3 to the ST lead in the wipe-out sender, Fig. 6, and also connects ground through its contact 2 to the winding of relay L. The operation of relay 4 also connects negative signal battery through contact 1 of relay 4, through normal contact 1 of relay J, through normal contact 1 of relay M, to lead A, which causes the A— relay in the subscriber's equipment, Fig. 1, to operate. The operation of the A— relay connects ground from contact 4 of relay D through contact 1 of relay A—, through normal contact 3 of relay S, to the rotary magnet Rot. Mag., thereby operating it. The negative battery is removed from lead A with the operation of relay J, described later, and this permits the rotary magnet in the subscriber's equipment to step the switch to terminal 2. Stepping the switch to terminal 2 connects the first group of indicators (stock number) to the line relays. The path for the operating magnets of the hundreds, tens and units indicators H, T and U is through banks T, U and F, to contact 2 of relays A+, B— and B+. Ground on the wiper of bank B operates relay S which locks up thereby completing the pulsing circuit for the thousands stock number indicator Th through contact 4 of relay S and contact 2 of relay A—. Ground from wiper B also operates relay C which locks up through its winding $a$, and its own contact 1, to ground on contact 4 of relay D. The operation of relay C connects ground through contact 2 of relay C to the ON contact of the dial, so that any further attempts to dial will not interrupt the ground circuit for the windings 1 of the B— and B+ relays. It can be readily seen that any operation of the dial will close the ON contact connecting ground through the ON contact to the winding 1 of the B— and B+ relays.

Referring now to the wipe-out sender, Fig. 6, ground on the ST lead from the register, Fig. 4, through the top contact of the ST cam, energizes the NEG magnet. When the top contact on the ST cam opens, the NEG magnet steps the rotary switch wipers NEG STP, PU and NEG to terminal 1. This connects ground from the wiper of the NEG STP brush through terminal 1 to the side contact of the ST cam which, when closed, energizes the POS magnet. When the side contact on the ST cam opens, the release of the POS magnet steps the rotary switch wipers POS STP and POS to terminal 1. Both the POS and NEG switches continue to step alternately. In position 1 of the NEG switch, battery is fed from the PU wiper over terminal 1 to the PU lead which, referring to Fig. 4, operates relay L. The operation of relay L connects battery through its contact 1 to the STP magnet, thereby stepping the minor switch wipers A and C to terminal 1. The operation of relay L also connects battery on its contact 2 to the winding of relay J which operates and locks up through its contact 3 to battery on the normal contact 4 of relay M. The operation of relay J connects battery from normal contact 4 of relay M, through contact 4 of relay J, to winding $a$ of relay B, holding it operated. Relay B holds relay G operated through contact 2 of relay B. The operation of relay J connects lines A and B through its contact 1 and wiper A of the minor switch, and its contact 2, to the wipe-out sender.

The subscriber's equipment is now ready to receive wipe-out pulses. In the wipe-out sender, Fig. 6, both the NEG and POS wipers when in position 2 have connected signaling battery to the top and side contacts of cams A and B, and the POS wiper has also connected signaling battery to the side contact of cam A'. The top and side contacts of the various cams, A, A' and B, shown in the wipe-out sender, close their respective circuits alternately, thereby sending out negative and positive impulses on lines A and B. At the same time, the contacts on the ST cam cause the rotary switches to step around. It should be noted that the pulses sent out over line A are generated by the top and side contacts of cam A, Fig. 6, for the first train of ten pulses. When the rotary switches reach position 12 the minus and plus signaling batteries are disconnected from the A, and B cam contacts. However, the rotary switches continue to step so long as ground remains upon the ST lead. When the PU wiper reaches terminal 13 the PU lead is again energized, reoperating relay L, Fig. 4, which had released after the PU wiper left terminal 1.

The reoperation of relay L steps the minor switch wipers A and C, Fig. 4, to terminal 2. This connects line A through terminal 2 to lead A' in the wipe-out sender, so that succeeding trains of impulses sent over subscriber's line A are generated by the side and top contacts of cam A', Fig. 6. When the side contacts of the rotary switches reach terminal 14, the minus and plus signaling batteries are connected to cams A' and B and another train of ten positive and negative impulses is sent over line B, while ten positive impulses are sent over line A. When the NEG wiper reaches terminal 24, negative battery is connected to the top contact of the A' cam, and one negative impulse generated by this cam is sent over A'. This is a switching impulse, the function of which will be described later.

The foregoing operations are repeated until five trains of positive and negative impulses have been sent over line B, and one train of positive and negative impulses and four trains of positive impulses have been sent over line A, together with a single negative impulse following the second, third, fourth and fifth trains of impulses. Meanwhile, the impulses sent over the PU lead by the PU wiper have operated relay L, Fig. 4, five times and stepped the minor switch to terminal 5. The sixth impulse sent over the PU lead steps the minor switch wipers A and C to terminal 6 in which position battery from contact 2 of relay L, through wiper C on the minor switch, operates relay GL. Relay GL locks up to battery on the normal contact 4 of relay M, through contact 3 of relay J. The operation of relay GL connects ground through contact 2 of relay GL to the GL lamp which indicates to the operator that wipe-out has been completed.

Referring to Fig. 1, the first train of ten wipe-out impulses actuated relays A— and B—, and relays A+ and B+ in pairs. The function of the $r$ winding on these relays is to restore the relay to its non-operated position when the current through the $l$ winding ceases, as otherwise a relay of this type would remain in the operated position until it received a pulse of the opposite polarity. The operation of the A—, A+, B— and B+ relays connects battery through contact 2 on these relays, through paths previously described, to the stock number indicating operating magnets. The actuation leads AG of these magnets being open, the path for pulses through the windings of the magnets is open when the indicators reach their blank positions. While the relays are pulsing the indicators, contact 1 of relay A— is sending ground pulses through contact 3 of relay S to the relay E. The relay E being of the slow release type, holds up during the pulsing. The operation of the relay E connects ground from contact 4 of relay D, through contact 1 of relay E, to the rotary magnet Rot. Mag., but the switch does not step until relay E releases at the end of the first train of ten impulses. The release of the rotary magnet steps the wipers to terminal 3. In this position, wiper B connects ground from terminal 4 of relay D, through bank terminal 3, through contact 2 of relay S, to the winding of relay S. This diverts the operating current previously flowing through the winding of relay S, thereby causing it to release.

In position 3, the rotary switch connects the indicator units for registering the "open" price through the T, U and F banks to the A+, B— and B+ relay contacts. The next train of ten impulses blanks out these indicators. Following this train of impulses, the single negative pulse sent over line A operates the relay A—, connecting ground from terminal 4 of the relay D, through contact 1 of relay A—, through normal contact 3 of relay S, to the rotary magnet. When the negative pulse ceases, the rotary switch steps to position 4. In this position the "high" group of indicators is connected to the line relays, and these are blanked out by the next train of impulses. Similarly, the "low" and "last" groups of indicators are blanked out. The last negative impulse sent over line A, following the fifth train of wipe-out impulses, steps the rotary switch, Fig. 1, to position 7. This again reconnects the stock number indicators to the A—, A+, B— and B+ relay contacts.

In position 7, the wiper B connects ground to the winding of relay S, thereby operating it, and relay S connects the thousands stock number indicator through its contact 4 to contact 2 of relay A—. The subscriber's equipment is now ready to receive the new stock number and prices.

During the wipe-out operation, the operator has depressed keys corresponding to the last three digits of the stock number, and the "open," "high," "low" and "last" prices of that stock. A unit key group for recording the last three digits of a stock number is shown on Fig. 7. Similar key groups record the prices. When the operator perceives the GL light, Fig. 4, and has completed the depression of the keys previously mentioned, she operates the start key, Fig. 8, which connects ground from the normal contact 3 of relay ST, over lead C, to the winding of relay M, Fig. 4. The relay M operates, connecting battery to the winding of relay D, through contact 4 of relay M. Relay D operates and removes ground from the AG lead of the H, T and U indicators, Fig. 4, and at the same time connects the windings of the magnets of the H, T and U indicators, through contacts 2, 3 and 4 of relay D, to leads X, Y and Z in the wipe-out sender, Fig. 6.

Pulses are constantly being generated by the top and side contacts of cams WO and WO', Fig. 6. These pulses step the indicators H, T and U, Fig. 4, around to their blank position at which point they stop. The operation of relay M, Fig. 4, has removed the locking battery from relay J and from relay GL. These relays release, as well as relay B, which was held operated through contact 4 of relay J. The release of relay GL extinguishes the lamp GL.

The release of relay B, Fig. 4, releases relay G, which releases relay 4 and extinguishes the RL lamp. The operation of relay M closes a circuit from its winding, through its contact 3, to lead E, Fig. 8, and also extends leads A, B and D through the register to Fig. 8. When the start key is released the operating path for relay M is opened, but relay M locks up over lead E in series with relay ST, Fig. 8. The operation of relay ST operates relay P over the following path: ground through contact 3 of relay ST, through normal contact 2 of relay Q, to the winding of relay P. The operation of relay P connects ground from its contact 3, through contact 1 of relay ST, to the O lead of all key relay groups, Figs. 7, 8 and 9. This ground, passing through the contacts of the particular keys depressed by the operator, operates combinations of storage relays shown on Fig. 7. One group of keys and the groups of storage relays operated thereby are detailed in Fig. 7.

The following scheme is used for storing the setting of the keys: for any key 1 to 5 a corresponding relay 1 to 5 is operated; for any key 6 to 10 an additional common relay is operated and one of the relays 1 to 5, thus, key 6 would cause relay 6 and relay 1 to operate, the circuit being as follows: ground over the O lead, through the winding of relay 6, through the contact of key 6, through the winding of relay 1, to battery. All storage relays which operate lock up through their own contacts 1, the locking path being battery through the winding of the storage relay, through contact 1 of the storage relay, to ground, over the L lead, the ground being supplied from contact 2 of the relay ST. Operation of relay P also connects ground through its contact, to the winding of relay Q. Operation of relay Q closes a path for ground through contact 1 of relay P, through contact 3 of relay Q, to the winding of relay RM. Operation of relay RM connects ground over the RM leads to each of the key groups, Fig. 7. This ground operates magnets RLS of the key strips, thereby releasing the keys depressed by the operator and freeing the keyboard for the setting up of another call. The operation of relay Q opens the operating path for relay P, which releases. Relay Q locks up through its own contact 2 to ground on contact 3 of relay ST. The release of relay P also releases relay RM thereby deenergizing magnets RLS of the key strips.

The operation of relay ST removes ground from the start keys at its contact 3. This prevents the connection of any other registers to the transmitter until the call in progress has been completed. The operation of relay ST connects ground through its contact 3 to contact 2 on the S cam, Fig. 9. When contact 2 on the cam S closes, the NEG magnet is energized. When the cam contact opens, the rotary switch, including the lower banks A and B, Fig. 8, and KR and BR, Fig. 9, steps. This closes a path for ground through the BR wiper on the NEG switch to the contact 1 of cam S. When contact 1 closes the POS magnet will be energized, and upon breaking, the POS rotary switch, including the upper banks A and B, Fig. 8, banks SN and BR, Fig. 9, will step. In this position the KR wiper connects ground through the first terminal of the bank, through the normal contact 2 of relay Q, Fig. 9, normal contact 2 of relay P, normal contact 2 of relay N, to the windings of the SN relays, SN—1, SN—2 and SN—3, Fig. 8. The operation of the SN relays connects the storage relay groups, Fig. 7, to the banks A and B, Fig. 8, of the POS and NEG rotary switches. Meanwhile, the cam S has stepped the rotary switches to position 2. In this position, the wipers A and B on the POS and NEG rotary switches are connected over lead 1 to armature 2 of relay 5 in each key set-up relay group. Depending upon the combinations of the relays set up in the groups, a path may be closed for signaling battery (plus S or minus S) to the contacts of cams A and B, Fig. 6. Thus, if key 10 has been depressed, relays 5 and 6 will be operated and under these conditions signaling battery will be connected to leads 1 to 10, and the brushes in rotating over the corresponding bank terminals will be in constant contact with signaling battery. To take another example, if relay 1 is the only relay operated, signaling battery will be connected to lead 10 only. The result is that, in accordance with the keys depressed, signaling battery will be connected to the contacts of cams A and B for a period equivalent to the time required for sending out a number of pulses corresponding to the key depressed. The pulses generated by the contacts of cams A and B are sent over lines A and B to the subscriber's equipment where they actuate the stock number indicators. Bank A, Fig. 8, of the NEG rotary switch has its terminal permanently strapped to minus signaling battery, in accordance with the first digit of the stock number, which is the same for all stocks routed to the group of registers under a particular operator's supervision.

When the wiper on the KR bank, Fig. 9, left terminal 1, the SN relays, Fig. 8, locked up through contact 11 of relay SN—3 in series with relay N, through normal contact 1 of relay P, through normal contact 1 of relay RLS, Fig. 8, to ground on contact 1 of relay Q. The operation of relay N transfers the leads from the KR bank to the OP relays, shown as one relay. When the KR wiper reaches terminal 13 ground is sent through normal contacts 2 of relays P and Q, through contact 2 of relay N, through contact 12 of relay SN—3, to the winding of the OP relays, thereby operating them. This connects the storage relay groups for the "open" price to the banks of the rotary switches, and a transmission of pulses, similar to that for the stock number, occurs with the exception that nothing is transmitted from the A bank of the negative rotary switch. When the KR wiper leaves terminal 13, relay OP locks through its contact 1, through the winding of relay P, over contact 1 of relay Q, and over contact 1 of relay RLS, Fig. 8, and contact 1 of relay Q, to ground.

The operation of relay P transfers the path of the next ground pulses from the KR bank to the HI relay. The operation of relay P releases relays SN and N since the holding path for these relays was through the normal contact 1 of relay P.

A similar transmission of pulses occurs for each of the prices to be transmitted. After the first train of pulses the SN wiper rested on terminal 12 momentarily, thereby connecting minus signaling battery to normal contact 3 of relay N, but relay N being operated in series with relay SN—3 no path was available for the minus signaling battery. However, after the second train of pulses, minus signaling battery was sent through terminal 24 of the SN bank to contact 2 on the cam A which resulted in a single negative pulse being generated when contact 2 closed. This single negative pulse served to switch the next group of indicators to the line relays in the subscriber's equipment, as previously described. After the third train of pulses the single negative pulse was transmitted through terminal 12 on the SN bank, through the normal contact 3 of relay N, which is now down, to contact 2 on cam A. After the fourth train of pulses the single negative pulse is transmitted through terminal 24 to contact 2 of the cam A.

The conditions, after the fifth train of pulses, are as follows: Relay LA, Fig. 9, is locked up in series with relay P, and the KR wiper is approaching terminal 14.

Referring now to the subscriber's equipment, Fig. 1, the first train of pulses sent out by the operator's transmitter actuates relays A—, A+, B— and B+. Contacts 2 of these relays operate the stock number indicators through banks T, U and F, and through contact 4 of relay S. Contact 1 of the A— relay sends a train of ground pulses from contact 4 of relay D to the winding of relay E. The relay E holds up during the pulses, thereby energizing the rotary magnet. At the completion of the first train of pulses the rotary magnet releases, stepping the wipers to position 8. In position 8, ground on the B wiper short-circuits relay S causing it to release. The next train of pulses actuate relays A+, B— and B+ setting up the "open" prices on the corresponding indicators. It should be noted that from position 7 on, the wiper AG has connected actuating ground to the indicators, permitting them to step off their blank positions. The single negative pulse following the second train of actuating pulses operates relay A— energizing the rotary magnet which causes the switch to step to position 9, when the negative pulse ceases. Similarly, the "high," "low" and "last" prices are transmitted to their corresponding groups of indicators.

Following the fifth train of pulses, the release of the selector equipment is accomplished as described above (preliminary pulse), and the operation of the relay H, Fig. 3, sends positive battery over the A lead and negative battery over the B lead operating the A+ and B— relays. This completes a path for ground through contact 1 of the A+ relay, through contact 1 of the B— relay, through contact 3 of relay D, to the coil of relay D, which diverts the current from the coil of relay D causing it to release. Upon the release of relay D, ground is connected through its normal contact 1 to the A wiper which is resting on terminal 11. A path is completed through terminal 11, through the normal contact of the rotary magnet, causing the rotary magnet to vibrate, thereby stepping the switch around to terminal 14 at which point the circuit through the A wiper is opened. The subscriber's equipment is now ready to inaugurate another call.

When the KR wiper, Fig. 9, reaches terminal 14 a circuit is closed for ground from the KR wiper through terminal 14, through contact 2 of the LA relay, to the winding of relay RLS. Relay RLS operates and locks up through its contact 1 to ground on contact 1 of relay Q. The operation of relay RLS opens the holding path for the relay ST, Fig. 8, and the relay M, Fig. 4, thereby releasing them. The release of relay ST releases the various storage relays held locked over their respective L leads to contact 2 of relay ST. The operation of relay RLS also opens the locking path for the relays LA and P. The relay Q remains locked up through its own contact 2 to the BR bank of the NEG rotary switch, thus insuring the restoration of the rotary switches to normal before another call is started. The operation of relay RLS connects ground through its contact 2 to the D lead which through contact 5 on relay M, Fig. 4, and through the D brush of the selector, Fig. 3, operates relay H. The relay H locks up through its contact 4 to ground on the contact 2 of relay G. The operation of relay H connects plus signaling battery to the A lead and minus signaling battery to the B lead which condition causes the release of the subscriber's equipment. The operation of relay H also opens the holding path for relay B permitting it to release which in turn releases the relay G. The release of relays B and G completes a path for ground through normal contact 1 of relay B, through normal contact 3 of relay G, through the ON—2 contacts, to the release magnet which restores the wipers to normal. The release of relay G opens the locking circuit for relay H and also removes ground from the C lead. The removal of ground from the C lead releases relay CI—1 of the first line finder, Fig. 2, which in turn releases the relays L—1 and CO—1 restoring the line finder to normal.

The following describes the progress of a call requesting a quotation on a stock which is sufficiently active to justify its assignment to the automatic sender level on the selector, Fig. 3. This level is shown as level 9. The subscriber originates the request in the same manner as for a stock handled by a manual operator but by dialing a 9 for the first digit the subscriber's lines are connected through Fig. 3 to an automatic sender, Figs. 10, 11, 12, 14, 15 and 16.

The automatic sender functions as follows: the subscriber in dialing the second and third digits of a stock number actuates a hundred point connector, similar to those used in step-by-step telephone systems. The connector, after testing for busy, connects the automatic sender equipment to a group of indicators displaying the price of the stock requested. These indicators are part of a board similar to a standard Teleregister. The automatic sender sends a train of eleven impulses to the indicators in this stock position, thereby causing them to rotate one complete rotation. This leaves the price intact, but in making the complete rotation the indicators, at some point in the train of impulses, pass through their blank positions, and the impulses passing through the coils of the indicator magnets in blank positions actuated relays in the automatic sender indicating that certain indicators were passing through "blank." The automatic transmitter, by recording the point in the rotation at which the indicators pass through their blank positions, determines the price previously displayed upon the indicators. This information is used to operate storage relays similar to those in a manual sender, Figs. 7 to 9.

Upon completing selection, ground over the B lead from the subscriber's premises operates relay B, Fig. 10, and the path is through normal contact 2 on relay M, normal contact 2 on relay J, to the coil of relay B. The operation of relay B operates relay G from ground on normal contact 2 of relay RLS, normal contact 3 on relay SCH, Fig. 11, normal contact 1 on relay HH, contact 1 on relay B, Fig. 10, to the coil of relay G.

The subscriber now dials the second digit of the stock number, and relay B, Fig. 10, releases a number of times corresponding to the digit dialed. The release of relay B closes a path for ground from normal contact 2 on relay RLS, through normal contact 3 on relay SCH, Fig. 11, through normal contact 1 on relay HH, through normal contact 1 on relay B, Fig. 10, through operated contact 1 on relay G, through the ON contact 1, Fig. 11, through the winding of relay AW, to the vertical magnets VV. This causes the connector brush T to rise vertically. During the dialing, the pulses through relay AW hold relay AW operated. Immediately following the first pulse, the ON springs operate, transferring the pulsing path from ON contact 1 to ON contact 2, through contact 1 of relay AW, through the winding of relay AW, to magnet VV. At the end of the train of impulses relay AW releases, thereby transferring the pulsing path from the vertical to the rotary magnets RR.

The subscriber now dials the third digit of the stock number. Relay B again releases a number of times corresponding to the digit dialed, thereby actuating the magnet RR. The path for the pulses is from normal contact 1 of relay B, Fig. 10, through contact 1 of relay G, through contact 2 on the ON springs, Fig. 11, through normal contact 1 of relay AW, to the rotary magnet RR and the winding of relay F. Relay F holds up during the train of pulses, while the operation of magnet RR steps the selector brush T horizontally around to the terminal of the stock relay which, in the example chosen, is 926. The nine represents the level in the selector, Fig. 3, the two represents the level in the connector, Fig. 10, and the six represents the terminal in level 2 of the connector. No fourth digit is dialed.

At the beginning of the third digit dialed the operation of relay F, Fig. 11, closed a path for ground through contact 1 of relay F, to the winding of relay H. This operates relay H. At the end of the third digit relay H holds in series with relay HH, the path being through contact 1 on relay H, through the winding of relay HH, to ground on contact 3 of the off-normal contacts ON. The operation of relay HH connects ground from normal contact 2 on relay RLS, Fig. 10, through normal contact 3 on relay SCH, Fig. 11, through contact 1 on relay HH, to the winding $a$ of relay BT. The other end of winding $a$ on relay BT is connected to selector brush T. If the stock chosen is busy because another automatic sender is connected to it the bank terminal will be grounded as described later, and relay BT will fail to operate. In this case, relay G, Fig. 10, will release connecting ground from contact 3 on the ON springs, Fig. 11, through normal contact 3 of relay G, through normal contact 4 of relay M, to lead D, which effects the release of the selector as previously described for a manually controlled call. This ground also energizes the release magnet REL, Fig. 11 through contact 4 of the ON springs, restoring the connector to normal.

If the stock is not in use relay BT will operate, the path being from battery through the winding of relay 926, through the connector brush and bank terminal, through winding $a$ of relay BT, to the ground previously detailed.

The operation of relay BT closes a locking path for relay BT through winding $b$. The path is through preliminary contact 2 on relay BT, through normal contact 4 on relay SCH, to ground on normal contact 2 of relay RLS, Fig. 10. The operation of relay BT connects ground through its contact 1, to the connector brush and bank terminal, thereby operating the stock relay 926. At the same time, the operation of relay BT connects ground through its contact 3 to the winding of relay ST, Fig. 10. The operation of relay ST connects ground through its contact 1 and normal contact 3 of relay SWO to the winding of relay L which operates relay L.

The operation of relay ST also connects ground through its contact 3 and normal contact 4 of relay SWO to the ST lead, to the wipe-out sender, Fig. 6. This causes the wipe-out sender to function as described in the previous description of a manually handled call. The operation of relay L operates the magnet STP of the minor switch WO through contact 1 of relay L.

The operation of relay L closes a path through its contact 2 for the operation of relay J. Relay J locks up through its contact 4 to ground on normal contact 3 of relay M.

The operation of relay J closes a path for ground through its contact 3 to hold relay B operated. The operation of relay J also connects subscriber's lines A and B through its contacts 1 and 2 and line A through bank A of the minor switch WO, to the wipe-out sender. As the wipe-out proceeds, the minor switch WO steps once for each train of ten wipe-out pulses sent out. When wipe-out is completed, the minor switch steps to terminal 6 and ground on wiper B operates relay SWO which locks up through its contact 2, to ground on normal contact 3 of relay RLS. The operation of relay SWO connects ground from the off-normal contact ON of minor switch WO, through its contact 1, to the release magnet RLS of minor switch WO. This restores the minor switch to normal.

The operation of relay SWO also disconnected through its normal contacts 4 and 3, ground from lead ST in the wipe-out sender, and from relay L respectively. This stops the wipe-out sender and prevents further operation of minor switch WO.

During the wipe-out operation the following has been taking place: The operation of stock relay 926 operated relays in the storage groups of relays HSN and TSN, Fig. 14, corresponding to the number of the stock relay. In the particular case chosen, relay 2 in the HSN group is operated as follows: battery through contact 1 of stock relay 926, Fig. 11, over lead 2, through the winding of relay 2 of the HSN group, Fig. 14, to ground. Relays 1 and 6 are operated in the TSN group as follows: battery through winding $a$ of relay 6, over lead C, through contact 2 of relay 926, over lead 1 to relay 1 of the TSN group, Fig. 14, and then to ground. The relays lock up through their own contacts 1, through normal contact 4 on relay RLS, Fig. 10, to ground on normal contact 3 of relay REL, Fig. 11. The operation of relay ST, Fig. 10, connected battery through normal contact 2 of relay HOM, Fig. 11, through normal contact 1 of relay REL, through contact 2 of relay ST, Fig. 10, through terminal 25 of bank A of the rotary switch, Fig. 12, through cam contact A, to the rotary magnet ROT. In response to the pulses generated by cam contact A the rotary switch proceeds to step. After leaving terminal 1, battery is fed from the strapped terminals of bank A to cam contact A.

When wiper C of the rotary switch, Fig. 12, reaches terminal 1, relay STP, Fig. 11, operates, the path being battery through normal contact 2 of relay HOM, Fig. 11, through normal contact 1 of relay REL, through wiper C, Fig. 12, to the winding of relay STP, Fig. 11. This operates the stepper magnet ST of minor switch CH, the path being battery from normal contact 2 of relay HOM, through normal contact 1 of relay REL, through contact 2 of relay STP, to the ST magnet. This steps the wipers of the minor switch CH to terminal 1. When wiper C leaves terminal 1, relay STP releases, thereby operating the three relays designated OP, Figs. 15 and 16, the path being battery through normal contact 2 of relay HOM, Fig. 11, through normal contact 1 of relay REL, through normal contact 2 of relay STP, through wiper A, to the windings of the OP relays.

The operation of the OP relays connects groups of storage relays to the T, U and F banks of the rotary switch, Fig. 12.

When relay STP released a path was also closed for battery through normal contact 2 of relay HOM, Fig. 11, through normal contact 1 of relay STP, through resistance, through wiper B of minor switch CH, through a contact of stock relay 926, over lead OP, to the winding of the OP relay in the stock space, Fig. 13. This connected the group of indicators displaying the "open" price over leads T, U and F, through contacts of stock relay 926, through the cam contacts T, U and F, Fig. 12. When wiper B reached terminal 1 it connected battery from the bank terminals to cam contacts T, U and F. The pulses generated by these contacts served to operate the indicators in the checkboard.

When one of the indicators, being rotated, reaches blank the next pulse stepping it off blank takes a path over one of the leads AG, designated AGT, AGU and AGF, through the stock relay 926, Fig. 11, to one of the relays T, U or F, Fig. 12.

Let us suppose, for example, that the price displayed on the indicators was 987. After two pulses have been sent to the indicators the indicator T will have reached blank. The third pulse sent will operate relay T, Fig. 12, the path being battery through bank B of the rotary switch, through cam contact T, through contact T of stock relay 926, through contact 1 of relay OP, Fig. 13, through the coil of indicator T, through the short segment of the commutator, through contact 4 of relay OP, through contact AGT of stock relay 926, Fig. 11, through the winding of relay T, Fig. 12, to ground. The resistance of the relays T, U and F is low enough so as not to interfere with the operation of the indicator units.

The operation of relay T connects battery through contact 1 on relay T, through terminal 4 on bank T, through contact 4 on relay OP, Fig. 15, through the winding of relay 4, through the winding of relay 6, to ground. The operation of relays 4 and 6 records the digit 9, as previously described for a manually handled call.

Similarly, after three pulses had been sent, indicator U reached blank and the fourth pulse operated relay U, thereby operating relays 6 and 3 in the units storage relay group of the "open" price, Fig. 15, and the same operations recorded the setting of the fractions indicator in its associated group of storage relays.

When the wiper C, Fig. 12, reaches terminal 7, a path is closed for the operation of the relay TR, Fig. 15, which short-circuits the relays 6 in the storage groups so that any operation of the T, U or F relays, Fig. 12, will operate only one relay in the storage groups. This is in accordance with the practice outlined previously for recording numbers one to five. When the wiper C reaches terminal 12, relay STP, Fig. 11, is again operated thereby releasing the OP relays, Figs. 15 and 16, and the OP relay, Fig. 13. The operation of relay STP, Fig. 11, steps the minor switch CH to the HI terminal. When the wiper C, Fig. 12, leaves terminal 12, relay STP releases thereby operating the HI relays in Figs. 16 and 13. This connects the groups of indicators displaying the "high" prices to the cams T, U and F, Fig. 12, and an operation similar to that described for the "open" indicators takes place, thereby recording in the HI storage relays, Fig. 16, the price displayed by the "high" indicator units. The same operations are repeated for the "low" and "last" prices.

If, however, this process is interrupted by the posting of a new price on the groups of indicators being checked, the groups of indicators being reset are immediately disconnected from the automatic sender. This is accomplished through the operation of the range relays in the checkboard selector shown on Fig. 13. When one of these relays is operated, a ground is connected through a contact of the gang relay, Fig. 13, to the winding of the associated OP, HI, LO and LA relays. This immediately short-circuits the relay, or relays, connecting the groups of indicators to the automatic sender. Groups of indicators which are not being reset are permitted to return to their normal positions, since they remain connected to the automatic sender. At the same time that certain of the range relays OPN, HIH, LOW and LST, Fig. 13, operate, the gang relay in the stock space also operates, connecting the indicators to the pulsing equipment in the checkboard selector and sending ground back over the REL lead, through stock relay 926, Fig. 11, to the winding of relay REL. Relay REL operates and locks up through its contact 2 to ground on normal contact 2 of relay HOM. The operation of relay REL disconnects the ground on normal contact 3 of relay REL, through normal contact 4 of relay RLS, Fig. 10, which held the storage relays, Figs. 14, 15 and 16, locked up. This releases any storage relays which may have been operated prior to the time of posting a new price on the checkboard indicators.

The operation of relay REL also connects battery from winding of relay HOM, through contact 4 of relay REL, to bank A of the rotary switch, Fig. 12, which is connected to battery, thereby short-circuiting the winding of relay HOM. However, when the rotary switch reaches terminal 25 the battery on the wiper A is removed permitting relay HOM to operate. Relay HOM locks up through its contact 1 to ground on the ON contact. The ground on the ON contact, at the same time, energizes the RLM magnet of minor switch CH, through contact 1 of relay HOM, permitting it to restore to normal. The release of the minor switch opens the ON contact and releases relay HOM unless the relay REL is still operated.

The purpose of the HOM relay is to insure that a complete train of eleven pulses is sent to those indicators which were being pulsed at the time that a new price was posted. When relay HOM operates the locking circuit for relay REL is opened and relay REL releases unless the gang relay, Fig. 13, has not released, reconnecting the locking ground to the storage relays, and disconnecting the battery previously connected through contact 1 on relay REL to the winding of relay HOM. The release of relay HOM reconnects battery through normal contact 2 on relay HOM, through normal contact 1 on relay REL, through contact 2 on relay ST, Fig. 10, to terminal 25 of the rotary switch, Fig. 12, permitting the rotary switch to start once more.

The operations described above are repeated until a complete quotation is taken from the indicators in the checkboard, Fig. 13. When this is accomplished, the minor switch CH, Fig. 11, will step to terminal 5 thereby closing a circuit for battery from normal contact 2 of relay HOM, through normal contact 1 of relay REL, through normal contact 2 of relay STP, through wiper A, to the winding of relay SCH, which operates and locks up through its second winding, the locking path being through contact 3 on relay SCH to ground on normal contact 2 on relay RLS, Fig. 10. The operation of relay SCH holds ground through its contact 2, through normal contact 4 of relay RLS, Fig. 10, on the locking windings of the storage relays, Figs. 14, 15 and 16, while contact 4 of relay SCH operates the REL relay, which in turn disconnects ground previously supplied through normal contact 3 on relay REL. The operation of relay REL restores the minor switch and the rotary switch to normal, and then releases as described above.

The operation of the SCH relay, Fig. 11, removes ground on normal contact 2 of relay RLS, Fig. 10, through normal contact 4 of relay SCH, from winding b of relay BT. The release of relay BT removes ground from selector brush T, thereby releasing the stock relay 926. The release of relay BT also removes ground from the ST relay which releases preventing any further start of the rotary switch. The release of relay BT also removes ground supplied through its contact 4 to the armature of relay B, Fig. 10. This releases relay G. The release of relay G connects ground through contact 3 of the off-normal springs ON, Fig. 11, through normal contact 3 on relay G, Fig. 10, through contact 4 on the ON springs to the REL magnet, Fig. 11. This releases the connector switch, restoring it to normal.

The release of relay ST removes ground from the wipe-out sender, but in the event that wipe-out is not completed the operation of relay SCH holds ground on the L relay and the ST lead, Fig. 10. However, when wipe-out is completed, and relay SWO, Fig. 10, has operated and locked up to ground on normal contact 3 of relay RLS, a series circuit is completed for ground through contact 1 of relay SCH, through contact 3 of relay SWO, to relay M.

The operation of relay M connects the subscriber's lines A and B through its contacts 1 and 2, to the contacts of cams A and B, Fig. 14, which generate line pulses corresponding to the numbers set up in the storage relay groups. The operation of relay M releases relay J which in turn releases relay B.

The operation of relay M connects ground through its contact 3 to contact 2 on cam S, Fig. 15. The pulses generated by contact 2 of cam S step the NEG rotary switch, Fig. 15. The procedure from here on is the same as for a manually controlled call previously described. The groups of storage relays for the stock number and prices are connected one at a time to the banks of rotary switches and the storage relays control the number of pulses sent out by cams A and B, Fig. 14.

After the "last" price has been transmitted, a path is completed for ground through contact 14 on the KR bank of the NEG rotary switch, Fig. 15, through a contact of the LA relay, Fig. 16, to the winding of the RLS relay, Fig. 10. This operates the RLS relay, which opens the holding circuit for the storage relays, disconnects the starting ground from contact 2 of cam S, Fig. 15, permitting the rotary switches to restore to normal and releases relays SWO and SCH. The operation of relay RLS also connects ground through contact 1 of relay RLS to lead D which effects the release of the selector as previously described. The operation of the relay RLS also holds ground on lead C so that the automatic sender bank terminal in the selector is held busy until the automatic sender completely releases. The operation of the relay RLS also releases relay LA and relay P, Fig. 16.

The following describes a call originated by a subscriber for the purpose of wiping out a previous display when no new prices are required. The subscriber dials zero which causes the selector to pick an idle register, shown on Fig. 5, the selection being made as previously described for a normal call. The operation of a CI relay in the selector connects lines A and B through bank terminals in level 10 to a register shown on Fig. 5. The ground on line B from the subscriber's premises operates relay B in the register, the path being through normal contact 2 on relay J, to the winding of the relay B. The operation of the relay B connects ground through its contact 1 to relay G which operates, connecting ground through its contact 2 to the ST lead in the wipe-out sender, and through its contact 3 to the winding of the relay L. This starts the wipe-out sender as previously described.

The operation of relay G also connects ground through its contact 1, to lead C. The operation of relay L from the wipe-out sender connects ground through its contact 2 to the stepper magnet ST of the minor switch. The operation of relay L also connects ground through its contact 1 to relay J. This operates relay J which locks up to ground on the C lead, through its contact 1. When the minor switch steps, ground from contact 1 of relay G, through contact 1 of relay J, through bank A, terminal 1, holds relay G operated. This is necessary because the operation of relay J releases relay B.

At the same time, the operation of the minor switch connects subscriber's line A through contact 3 on relay J, through terminal 1 of bank B, to lead A in the wipe-out sender. After the first train of pulses for wiping out the stock number have been sent over lead A from the wipe-out sender, a pulse over lead PU reoperates relay L, stepping the minor switch to terminal 2. Throughout the second and succeeding trains of pulses, line A is connected through the terminals of bank B to lead A' in the wipe-out sender. When wipe-out is completed relay L energizes the stepping magnet of the minor switch for the sixth time, stepping wiper A to terminal 6 and completing a path for ground from contact 1 on relay G, through contact 1 on relay J, through terminal 6 of bank A, to lead D. The ground on lead D operates the relay H in the selector, Fig. 3, thereby releasing the selector, as previously described.

Meanwhile, relay G releases, connecting ground from normal contact 2 on relay G, through normal contact 2 on relay B, through the ON springs, to the release magnet RLM. This restores the minor switch to normal. The release of relay G also removes the ground from the ST lead and from the winding of relay L. With the release of relay G and the restoration of the selector, relay J no longer has a locking path and this also releases.

In the automatic transmitter (Figs. 10 to 16) previously described, the capacity of each selector shown on Fig. 11 is one hundred stocks. By utilizing a four digit stock number in place of the three digit stock number used in this particular example, the capacity of each selector could be increased to one thousand stocks. It should be noted that each stock relay is assigned a code number corresponding to its position on the bank of the selector switch. Each stock relay is equipped with a number of extra contacts so wired that the closure of these contacts will actuate the stock number storage relays (Fig. 14) and store in them a code corresponding to the number of the said stock relay. In this particular example, the stock relay number 926 is shown, and the operation of this relay will cause relays to be operated in the stock number storage relay group corresponding to the last two digits of the stock number, i. e., 26. By multiplying the leads from the stock number storage relay group to the stock relays in the automatic transmitter and connecting the proper leads to each stock relay, the automatic transmitter is caused to transmit the stock number dialed by the subscriber.

The checkboard may include a plurality of groups of indicators arranged as shown in the Haselton Patent 2,067,187, granted January 12, 1937. The indicator units may be of the construction shown in said patent or of that shown in the Haselton Patent 2,049,499, granted August 4, 1936. The stock price indicators may be selected and operated in accordance with the systems shown in the Haselton Patent No. 1,890,876, granted December 13, 1932, and his application Ser. No. 310,719, filed October 5, 1928, in the patent of Haselton et al. No. 1,890,878, granted December 13, 1932, and in the application of Raymond M. Hicks and Everett R. Leroy, Ser. No. 455,217, filed May 24, 1930.

While the invention has been described with reference to a system for supplying stock quotations and preferred instrumentalities for carrying out the invention have been shown and described, it is to be understood that this invention in whole or in part is applicable to other quotation systems and for supplying other information, that other instrumentalities may be substituted for those disclosed, that various changes and modifications may be made without departing from the spirit and scope of the invention, and that it is intended therefore in the appended claims to cover all such substitutions, changes and modifications.

We claim:

1. An automatic posting system for stocks or other items which fluctuate in value, comprising a transmitting station and a receiving station, said receiving station having means for transmitting item selection signals to said transmitting station, said transmitting station having a plurality of storage means on which the values of the respective items are set up, and having means responsive to said item selection signals for selecting the storage means corresponding to a selected item, other storage means at the transmitting station, and means responsive to the selection of the first named storage means corresponding to a selected item for transferring the value set up thereon to said other storage means, means under control of said other storage means for automatically transmitting to the receiving station signals representative of the value of the selected item, and posting means at the receiving station responsive to said last named signals for displaying the value of said item.

2. An automatic posting system for stocks or other items which fluctuate in value, comprising a transmitting station and a plurality of receiving stations, each of said receiving stations having means for transmitting item selection signals to said transmitting station and having means responsive to item value signals for posting the values of the selected items, said transmitting station having a plurality of storage means on which the values of the respective items are set up, and having means responsive to said item selection signals from any of said receiving stations seizing the storage means corresponding to a selected item, other storage means at the transmitting station, and means responsive to the seizure of the first named storage means corresponding to a selected item for transferring the value set up thereon to said other storage means and for immediately thereafter releasing the seized storage means for selection by another of said receiving stations, and means under control of said other storage means for automatically transmitting item value signals to the receiving station for operating the posting means to display the value of the selected item.

3. An automatic posting system for stocks or other items which fluctuate in value, comprising a transmitting station and a receiving station, said receiving station having means for transmitting item selection impulses to said transmitting station and having posting means responsive to telegraphic signals for posting the values of the selected items, said transmitting station having a plurality of storage means on which the values of the respective items are set up, and having means responsive to said item selection impulses for selecting the storage means corresponding to a selected item, other storage means at the transmitting station, and means responsive to the selection of the first named storage means corresponding to a selected item for transferring the value set up thereon to said other storage means, and means under control of said other storage means for automatically transmitting telegraphic signals to the receiving station for operating the posting means to display the value of the selected item.

4. An automatic posting system for stocks or other items which fluctuate in value, comprising a transmitting station and a receiving station, said receiving station having means for transmitting item selection signals to said transmitting station and having means for posting the values of the selected items, said posting means being actuatable by restoration signals to an initial starting position and actuatable by item value signals to a plurality of other positions for posting the values of the items, said transmitting station having a plurality of storage means on which the values of the respective items are set up, and having means responsive to said item selection signals for selecting the storage means corresponding to a selected item and automatic means responsive to the selection of the storage means corresponding to a selected item for first transmitting restoration signals to the receiving station to restore the posting means to its starting position and thereafter for transmitting item value signals to the receiving station to actuate the posting means to certain of its other positions to display the value of the selected item.

5. In a system of the character disclosed, the combination of a plurality of groups of resettable devices for setting up information in regard to a plurality of items, a plurality of groups of storage devices, means responsive to impulses received for seizing any group of resettable devices and for transferring the information in said group to an idle group of storage devices and for immediately thereafter releasing said seized group of resettable devices, means for transmitting telegraphic signals comprising impulses of positive and negative polarity under control of said group of storage devices, and a second means responsive to impulses received for seizing said group of resettable devices after said group has been released and during the transmission of said telegraphic signals under the control of the first of said groups of storage devices, for controlling another said group of storage devices, and means for transmitting telegraphic signals comprising impulses of positive and negative polarity under control of said second group of storage devices, said telegraphic signals representing the information set up in the seized group of resettable devices.

6. In a system of the character disclosed, a plurality of calling stations each having means for transmitting selecting impulses, a transmitting station comprising a plurality of groups of resettable devices for setting up information in regard to a plurality of items, a plurality of groups of storage devices, means responsive to selecting impulses received from a calling station for seizing any group of resettable devices and for transferring the information set up in said group to an idle group of storage devices and for immediately thereafter releasing said seized group of resettable devices, means for transmitting telegraphic signals under control of said group of storage devices to said calling station, a second means responsive to selecting impulses received from another calling station for seizing said group of resettable devices after said group has been released and during the transmission of telegraphic signals under the control of the first of said groups of storage devices, for controlling another of said groups of storage devices, means for transmitting telegraphic signals under control of said second group of storage devices to said another calling station, and means at the respective stations responsive to said telegraphic signals for visually displaying the information transmitted thereby.

7. In an apparatus comprising two indicators, one of which is rotatable and has a normal position and a plurality of moved positions, means for rotating said one indicator through a complete rotation, and means operable under control of the operating of said first indicator during its movement from normal to the previous set-up position as it is being given a complete rotation, for controlling the operation of the other of said indicators to display the same character.

8. In an apparatus of the character described, the combination of a pair of indicators, each of which is rotatable and has a normal position and a plurality of moved positions, means for restoring one of said indicators to normal, means for operating the other of said indicators through a complete rotation, and means under control of said second mentioned indicator adapted to be set in operation after said second mentioned indicator has been moved into normal position as it is being given a complete rotation for controlling the rotation of the first indicator to display the same character.

9. In an apparatus of the character described, the combination of a central information station comprising a plurality of groups of indicators upon which information may be set up as to different stocks, a plurality of subscribers' equipments, each including rotatable indicators for displaying the price of any desired stock, said indicators in said equipments and central station having a normal position and a plurality of moved positions, a plurality of registers located at the central station, a common wipeout sender associated with said registers, an automatic sender associated with each of said registers, said sender including a stock selector, an auxiliary transmitter, a plurality of storage devices and a main transmitter, means in each subscriber's equipment for transmitting impulses corresponding to the designation of any desired stock, means responsive to some of said impulses for conecting the subscriber's equipment through an idle register to its associated automatic sender, said selector being responsive to the remaining impulses corresponding to said designation, means operable under control of said selector for selecting a group of indicators corresponding to said stock designation, means automatically setting said auxiliary transmitter in operation for rotating said selected group of indicators through one complete turn, means operated as said indicators are moved through their normal position to control said storage devices in accordance with the price set up on said indicators, means also operable after selection has been effected for setting said wipeout sender in operation to normalize the subscribers' price indicators, and means for automatically setting said main transmitter in operation after said subscribers' indicators have been normalized and said storage devices have been controlled, to transmit impulses under control of said storage devices to set up the calling subscribers' indicators.

10. In an apparatus of the character described, the combination of a central information station comprising a plurality of groups of indicators upon which information may be set up as to different stocks, a plurality of subscribers' equipments, each including rotatable indicators for displaying the designation and price of any desired stock, said indicators in said equipments and central station having a normal position and a plurality of moved positions, a plurality of registers located at the central station, a common wipeout sender associated with said registers, an automatic sender associated with each of said registers, said sender including a stock selector, an auxiliary transmitter, a plurality of storage devices and a main transmitter, means in each subscriber's equipment for transmitting impulses corresponding to the designation of any desired stock, means responsive to some of said impulses for connecting the subscriber's equipment through an idle register to its associated selector, said selector being responsive to the remaining impulses corresponding to said designation, means operable under control of said selector for selecting a group of indicators corresponding to said stock designation, means operable under control of said stock selecting means for controlling certain of said storage devices in accordance with the designation of the stock, means automatically setting said auxiliary transmitter in operation for rotating said selected group of indicators through one complete turn, means operated as said indicators are moved through their normal position to control others of said storage devices in accordance with the price set up on said indicators, means also operable after the selection has been effected for setting said wipeout sender in operation to normalize the subscribers' designation and price indicators, and means for automatically setting said main transmitter in operation after said subscribers' indicators have been normalized and said storage devices have ben controlled, to transmit impulses under control of said storage devices to set up the calling subscribers' indicators.

11. The combination of a subscriber's equipment including transmitting means and a group of electromagnetically operated step by step indicators on which the price of a stock or other item may be displayed, each indicator being of a type which is restored to normal before it is reset, a central station including a plurality of groups of indicators for displaying the various prices of stocks, means responsive to impulses transmitted by said impulse transmitting means for connecting the subscriber's equipment to the central station, a selector, a wipeout sender, and a transmitter in the central station, means responsive to impulses received for controlling said selector for selecting any group of indicators, means for connecting said wipeout sender to the subscribers' indicators and for setting said sender in operation to transmit impulses to the subscribers' indicators to restore the same, storage means operated under control of said selector for storing the price displayed by the selected group of indicators, and means for transmitting impulses under the control of said storage means to the subscribers' indicators to display on said indicators the price of the selected group of indicators.

12. In an apparatus of the character described, the combination of a central information station comprising a plurality of groups of electromagnetically operated step by step indicators, a subscriber's equipment including a set of electromagnetically operated step by step indicators, an automatic sender at the central station, said sender including a selector, an auxiliary impulse transmitter, a plurality of storage devices and a main transmitter, means in the subscriber's equipment for transmitting impulses to the central station characterizing the designation of any desired group of indicators, means responsive to said impulses for connecting the subscribers' indicators to the automatic sender and for operating said selector, means operable under the control of said selector for selecting a group of indicators under the control of said designation impulses, means automatically setting said auxiliary transmitter in operation for rotating said selected indicators through one complete rotation, means for controlling said storage devices in accordance with the set-up in said selected group of indicators as said indicators are rotated, and means for automatically setting said main transmitter in operation after said storage devices have been controlled to transmit impulses under control of said storage devices to actuate the calling subscribers' indicators to display the information displayed on said selected group of indicators.

13. In an apparatus of the character described, the combination of a central information station comprising a plurality of groups of electromagnetically operated step by step indicators, a subscriber's equipment including a set of electromagnetically operated step by step indicators, an automatic sender at the central station, said sender including a selector, an auxiliary impulse transmitter, a plurality of storage devices and a main transmitter, means in the subscriber's equipment for transmitting impulses to the central station characterizing the designation of any desired group of indicators, means responsive to said impulses for connecting the subscribers' indicators to the automatic sender and for operating said selector, means operable under the control of said selector for selecting a group of indicators under the control of said designation impulses, means automatically setting said auxiliary transmitter in operation for rotating said selected indicators through one complete rotation, means for controlling said storage devices in accordance with the set-up in said selected group of indicators as said indicators are rotated, means for automatically setting said main transmitter in operation after said storage devices have been controlled to transmit impulses under control of said storage devices to actuate the calling subscribers' indicators to display the information displayed on said selected group of indicators, and means for releasing said selector and selecting means immediately after said storage devices have been controlled whereby said group of selected indicators may be reset during the time that the main transmitter operates to transmit information to the calling subscribers' indicators.

14. In a system of the character described, the combination of a plurality of subscribers' equipments each including a manipulative impulse transmitting mechanism and a set of indicators, a central information station comprising a large number of groups of indicators corresponding to various stocks or commodities, an operator's keyboard, operators' indicators, selecting mechanism responsive to impulses received from any of the subscribers' equipments for operating the operators' indicators for certain of said stocks or commodities and for automatically effecting selection of indicators for other stocks or commodities, means in the central station for automatically resetting the calling subscribers' indicators under control of the operator's keyboard, and means responsive to a selection of a group of indicators for automatically controlling a resetting operation of the calling subscribers' indicators.

15. In a system of the character described, the combination of a plurality of subscribers' equipments each including manipulative transmitting means for transmitting impulses characteristic of the designation of any one of a large plurality of items, each equipment also including indicators for receiving the information requested, a central transmitting station including a plurality of operators' keyboards and a corresponding plurality of groups of operators' indicators and a stock quotation board including a large plurality of groups of indicators, means responsive to impulses transmitted by the manipulative impulse transmitting means in any subscriber's equipment for selectively choosing and operating any of the groups of operators' indicators or for effecting selection of any one of a certain number of said groups of indicators on the stock quotation board, means under control of said operators' keyboards for setting up the indicators in the calling subscriber's equipment, and means operable automatically after selection of a group of indicators on said quotation board for resetting the calling subscribers' indicators to display the information displayed on said selected group of indicators.

HAROLD F. MAY.
FRAZIER O. STRATTON.